US012237568B2

(12) United States Patent
Kim et al.

(10) Patent No.: US 12,237,568 B2
(45) **Date of Patent: *Feb. 25, 2025**

(54) ELECTRONIC DEVICE INCLUDING 5G ANTENNA MODULE

(71) Applicant: Samsung Electronics Co., Ltd., Suwon-si (KR)

(72) Inventors: Jaehyung Kim, Suwon-si (KR); Jinkyu Bang, Suwon-si (KR); Hanbin Lee, Suwon-si (KR); Sangmin Han, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,439

(22) Filed: Mar. 27, 2023

(65) Prior Publication Data

US 2023/0238686 A1 Jul. 27, 2023

Related U.S. Application Data

(63) Continuation of application No. 17/341,900, filed on Jun. 8, 2021, now Pat. No. 11,616,288, which is a (Continued)

(30) Foreign Application Priority Data

Jul. 26, 2018 (KR) ........................ 10-2018-0086954

(51) Int. Cl.

*H01Q 5/25* (2015.01)
*H01Q 1/24* (2006.01)
*H01Q 1/38* (2006.01)

(52) U.S. Cl.

CPC ............... *H01Q 1/243* (2013.01); *H01Q 1/38* (2013.01); *H01Q 5/25* (2015.01)

(58) Field of Classification Search

CPC ............. H01Q 1/243; H01Q 5/25; H01Q 1/38

See application file for complete search history.

(56) References Cited

U.S. PATENT DOCUMENTS 9,520,650 B2 12/2016 Yang et al.
9,531,087 B2 12/2016 Ying (Continued)

FOREIGN PATENT DOCUMENTS

CN 105144470 A 12/2015
CN 107251444 A 10/2017

(Continued)

OTHER PUBLICATIONS

International Search Report dated Nov. 20, 2019, issued in an International Application No. PCT/KR2019/009288.

(Continued)

*Primary Examiner* — Henry Luong
(74) *Attorney, Agent, or Firm* — Jefferson IP Law, LLP

(57) ABSTRACT

An electronic device including an antenna module is provided. The electronic device includes a 5th generation (5G) antenna module that includes an antenna array, at least one conductive region operating as a ground with respect to the antenna array, and a first communication circuit feeding a power to the antenna array to communicate through a millimeter wave signal, and a printed circuit board (PCB) that includes a second communication circuit and a ground region. The second communication circuit feeds the power to an electrical path at least including the at least one conductive region and transmits or receives a signal in a frequency band different from a frequency band of the (Continued)

millimeter wave signal based on the electrical path supplied with the power and the ground region.

20 Claims, 23 Drawing Sheets

Related U.S. Application Data continuation of application No. 16/522,019, filed on Jul. 25, 2019, now Pat. No. 11,069,956.

(56) References Cited

U.S. PATENT DOCUMENTS

| | | | | |
|---|---|---|---|---|
| 9,705,206 | B2 | 7/2017 | Yosui | |
| 9,728,834 | B2 | 8/2017 | Takeda et al. | |
| 9,735,829 | B2 | 8/2017 | Cheon et al. | |
| 9,773,742 | B2 | 9/2017 | Kamgaing et al. | |
| 9,847,585 | B2 | 12/2017 | Yosui | |
| 9,972,892 | B2 | 5/2018 | Noori et al. | |
| 10,033,113 | B2 | 7/2018 | Yosui | |
| 10,096,888 | B2 | 10/2018 | Ahn et al. | |
| 10,270,186 | B2 | 4/2019 | Teshima et al. | |
| 10,297,900 | B2 | 5/2019 | Lee et al. | |
| 10,305,172 | B2 | 5/2019 | Noori et al. | |
| 10,418,687 | B2 | 9/2019 | Mow et al. | |
| 10,553,939 | B2 | 2/2020 | Daojian et al. | |
| 10,608,324 | B2 | 3/2020 | Lee et al. | |
| 10,651,544 | B2 | 5/2020 | Xia et al. | |
| 10,680,332 | B1 * | 6/2020 | Li | H01Q 13/106 |
| 10,784,904 | B2 | 9/2020 | Weissman et al. | |
| 11,190,224 | B2 | 11/2021 | Weissman et al. | |
| 11,223,104 | B2 | 1/2022 | Lee et al. | |
| 2012/0235880 | A1 | 9/2012 | Kim et al. | |
| 2012/0235881 | A1 | 9/2012 | Pan et al. | |
| 2013/0265199 | A1 | 10/2013 | Koskiniemi et al. | |
| 2015/0070219 | A1 | 3/2015 | Dinh et al. | |
| 2015/0116168 | A1 | 4/2015 | Yosui | |
| 2015/0116169 | A1 | 4/2015 | Ying | |
| 2015/0180136 | A1 | 6/2015 | Yosui | |
| 2015/0280318 | A1 | 10/2015 | Yang et al. | |
| 2015/0325925 | A1 | 11/2015 | Kamgaing et al. | |
| 2016/0072174 | A1 | 3/2016 | Takeda et al. | |
| 2016/0233573 | A1 | 8/2016 | Son et al. | |
| 2016/0277062 | A1 | 9/2016 | Cheon et al. | |
| 2016/0351998 | A1 | 12/2016 | Ahn et al. | |
| 2017/0062953 | A1 * | 3/2017 | Teshima | H01Q 9/42 |
| 2017/0212554 | A1 | 7/2017 | Guterman et al. | |
| 2018/0012852 | A1 | 1/2018 | Kamgaing et al. | |
| 2018/0026341 | A1 | 1/2018 | Mow et al. | |
| 2018/0069325 | A1 | 3/2018 | Yosui | |
| 2018/0212323 | A1 | 7/2018 | Daojian et al. | |
| 2018/0233817 | A1 | 8/2018 | Izawa | |
| 2018/0277936 | A1 | 9/2018 | Dinh et al. | |
| 2019/0181538 | A1 | 6/2019 | Xia et al. | |
| 2019/0207324 | A1 | 7/2019 | Teshima et al. | |
| 2020/0014095 | A1 | 1/2020 | Mow et al. | |

FOREIGN PATENT DOCUMENTS

| | | | |
|---|---|---|---|
| CN | 108028468 | A | 5/2018 |
| CN | 108232470 | A | 6/2018 |
| CN | 207459171 | U | 6/2018 |
| JP | 3211410 | U | 7/2017 |
| KR | 10-2012-0104896 | A | 9/2012 |
| KR | 10-2017-0082799 | A | 7/2017 |
| KR | 10-2017-0083949 | A | 7/2017 |
| KR | 10-2018-0035605 | A | 4/2018 |
| WO | 2014013806 | A1 | 1/2014 |
| WO | 2017-064947 | A1 | 4/2017 |

OTHER PUBLICATIONS

Extended European Search Report dated Jun. 8, 2021, issued in European Patent Application No. 19840737.1.
Korean Office Action dated Aug. 21, 2022, issued in Korean Patent Application No. 10-2018-0086954.
Chinese Office Action dated Nov. 9, 2023, issued in Chinese Patent Application No. 201980042524.8.
European Office Action dated Jul. 26, 2023, issued in European Patent Application No. 19 840 737.1.
Korean Notice of Allowance dated Aug. 29, 2023, issued in Korean Patent Application No. 10-2023-0018281.
Chinese Notice of Allowance dated Apr. 16, 2024, issued in Chinese Patent Application No. 201980042524.8.
Indian Hearing Notice dated May 1, 2024, issued in Indian Patent Application No. 202017052915.

* cited by examiner

ELECTRONIC DEVICE INCLUDING 5G ANTENNA MODULE

CROSS-REFERENCE TO RELATED APPLICATION(S)

This application is a continuation application of prior application Ser. No. 17/341,900, filed on Jun. 8, 2021, which is a continuation application of prior application Ser. No. 16/522,019, filed on Jul. 25, 2019, which has issued as U.S. Pat. No. 11,069,956 on Jul. 20, 2021 and is based on and claims priority under 35 U.S.C. § 119 of a Korean patent application number 10-2018-0086954, filed on Jul. 26, 2018, in the Korean Intellectual Property Office, the disclosure of which is incorporated by reference herein its entirety.

BACKGROUND

1. Field

The disclosure relates to an electronic device including a 5th generation (5G) antenna module.

2. Description of Related Art

As an information technology (IT) develops, various types of electronic devices such as a smartphone, a tablet personal computer (PC), and the like are being widely supplied. An electronic device may perform wireless communication with any other electronic device or a base station by using an antenna module.

Nowadays, as the network traffic of a mobile device sharply increases, a $5^{th}$ generation (5G) mobile communication technology is being developed. The use of a signal in a frequency band (e.g., about 6 GHz or higher (or above 6 GHz)) for a 5G mobile communication network makes it possible to shorten a wavelength of the signal in units of millimeter and to use a bandwidth more widely. This means that a large amount of information is transmitted or received. The signal, the wavelength of which is shortened in units of millimeter, may be referred to as a “millimeter wave signal”.

The above information is presented as background information only to assist with an understanding of the disclosure. No determination has been made, and no assertion is made, as to whether any of the above might be applicable as prior art with regard to the disclosure.

SUMMARY

As described as, even though a communication technology using a signal in an ultrahigh frequency band is developed, a communication technology using a signal in a relatively low frequency band (e.g., about 6 GHz or lower (or Sub-6 GHz)) is still required. For example, an electronic device may be required to support conventional communication technologies, which use a Sub-6 GHz frequency band, such as LTE communication, Wi-Fi communication, GPS communication, Bluetooth, or the like. Also, because there is also a way to use a frequency in the Sub-6 GHz band from among the 5G mobile communication manners, the electronic device needs to support communication using a signal in a relatively low frequency band. Accordingly, the electronic device may be required to include both a 5G antenna module for communication using a millimeter wave signal and an antenna supporting communication using a signal in a frequency band lower than the frequency band of the millimeter wave signal. In the disclosure, an antenna that supports communication using a signal in a frequency band, for example, the Sub-6 GHz frequency band lower than the frequency band of the millimeter wave signal may be referred to as a “legacy antenna”.

Due to strong straightness of a signal in an ultrahigh frequency band (e.g., about 6 GHz or higher), the 5G antenna module requires a beamforming technology, and the implementation of an array antenna may be indispensable for the beamforming technology. Accordingly, the 5G antenna module may be implemented with an independent module of an array shape where a plurality of antenna elements are arranged, separately from a conventional antenna, for example, the legacy antenna. Also, as the number of antenna elements increases to make the performance of the 5G antenna better, the size of the 5G antenna module may also increase.

Meanwhile, as the miniaturization of the electronic device is required, a mounting space in the electronic device may be insufficient. There may be a limitation in mounting the legacy antenna and the 5G antenna module on the electronic device, with a mounting space limited. For example, the size and performance of the 5G antenna module may be restricted. Also, in the case of improving the performance of antenna, it may be difficult to make the electronic device small-sized.

Aspects of the disclosure are to address at least the above-mentioned problems and/or disadvantages and to provide at least the advantages described below. Accordingly, an aspect of the disclosure is to provide an electronic device for solving the above-described problem and problems brought up in this specification.

Additional aspects will be set forth in part in the description which follows and, in part, will be apparent from the description, or may be learned by practice of the presented embodiments.

In accordance with an aspect of the disclosure, an electronic device is provided. The electronic device includes a 5G antenna module that includes an antenna array, at least one conductive region operating as a ground with respect to the antenna array, and a first communication circuit feeding a power to the antenna array to communicate through a millimeter wave signal, and a printed circuit board (PCB) that includes a second communication circuit and a ground region. The second communication circuit may feed the power to an electrical path at least including the at least one conductive region and may transmit or receive a signal in a frequency band different from a frequency band of the millimeter wave signal based on the electrical path supplied with the power and the ground region.

In accordance with another aspect of the disclosure, an electronic device is provided. The electronic device includes a housing that includes a first plate, a second plate facing away from the first plate, and a side member surrounding a space between the first plate and the second plate, a first printed circuit board (PCB) that is disposed in the housing, an antenna structure that is disposed in the housing and includes a second printed circuit board including a first surface facing in a first direction, a second surface facing away from the first surface, at least one conductive region between the first surface and the second surface, and an antenna array formed at at least a portion of the second printed circuit board, a first wireless communication circuit that is electrically connected to the antenna array and transmits and/or receives a first signal having a frequency between 6 GHz and 100 GHz, and a second wireless communication circuit that is electrically connected to the at least one conductive region and transmits and/or receives a second signal having a frequency between 400 MHz and 6 GHz.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
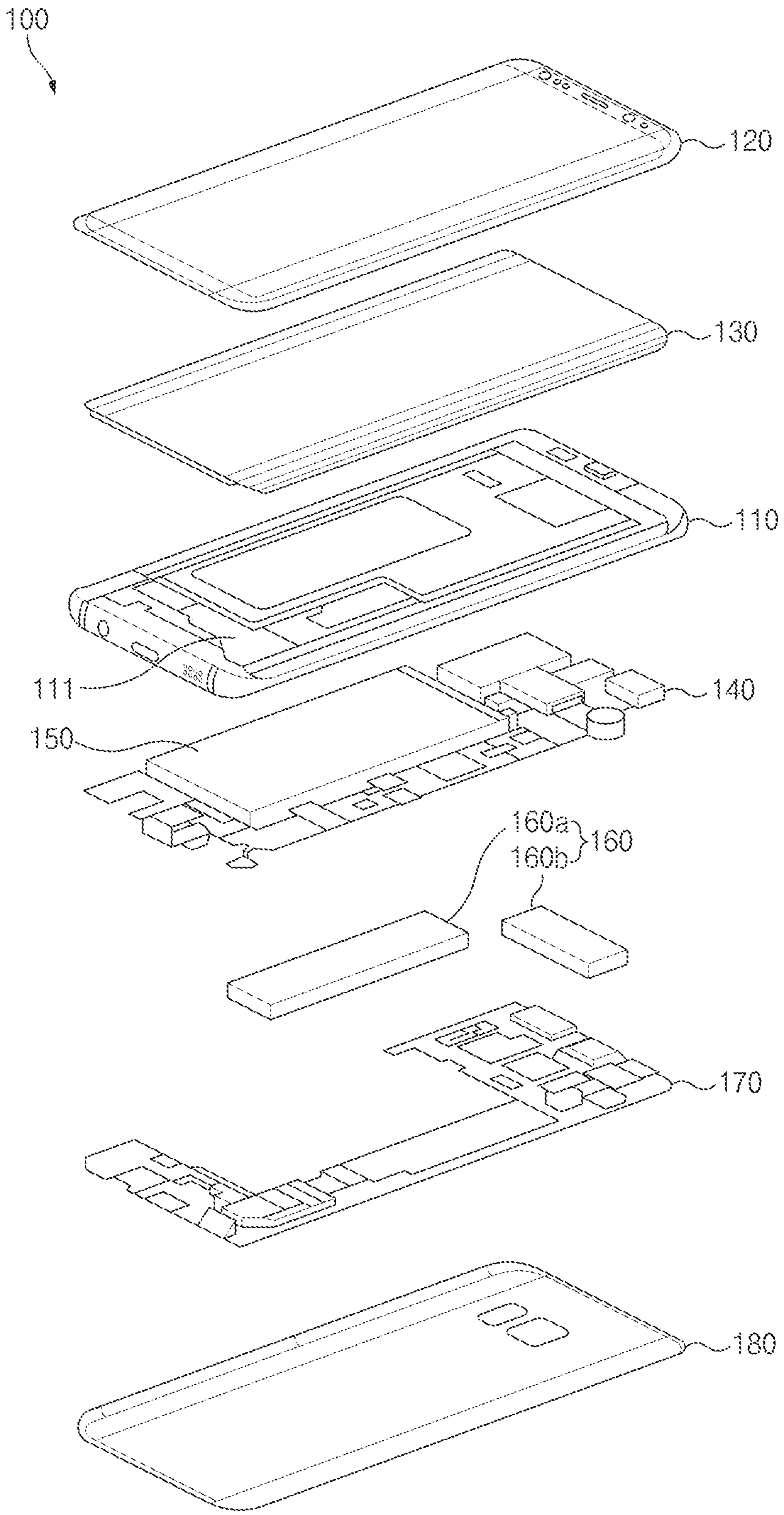
FIG. 1 is an exploded perspective view of an electronic device, according to an embodiment of the disclosure.

FIG. 1 is an exploded perspective view of an electronic device, according to an embodiment of the disclosure.

Referring to FIG. 1, an electronic device 100 may include a side bezel structure 110, a first support member 111 (e.g., a bracket), a front plate 120, a display 130, a printed circuit board (PCB) 140, a battery 150, a 5G antenna module 160, a second support member 170 (e.g., a rear case), and a back plate 180. In any embodiment, the electronic device 100 may not include a part (e.g., the first support member 111 or the second support member 170) of the components illustrated in FIG. 1 or may further include any other component not illustrated in FIG. 1.

The side bezel structure 110 may be combined with the front plate 120 and the back plate 180 to form a housing of the electronic device 100. The housing may form the exterior of the electronic device 100 and may protect components disposed in the electronic device 100 against an external environment (e.g., moisture or impact). In an embodiment, the side bezel structure 110 may form a side surface of the housing together with a portion of the front plate 120 and/or a portion of the back plate 180. The side surface may be understood as a region that surrounds a space between a first surface on which the front plate 120 is disposed and a second surface on which the back plate 180 is disposed. In the specification, the front plate 120 may be referred to as a “first plate”, and the back plate 180 may be referred to as a “second plate”.

According to an embodiment, at least a portion of the side bezel structure 110 may include a conductive region. In various embodiments, the conductive region may be supplied with a power such that electromagnetic resonance occurs. The electronic device 100 may receive or transmit a signal in a specified frequency band by using the electromagnetic resonance. In an embodiment, the specified frequency band may be 400 MHz or higher and 6 GHz or lower (or may range from 400 MHz to 6 GHz).

The first support member 111 may be disposed in the electronic device 100, and may be connected with the side bezel structure 110 or may be integrally formed with the side bezel structure 110. In an embodiment, the first support member 111 may support or fix electronic components disposed in the electronic device 100, for example, the printed circuit board 140, electronic components disposed on the printed circuit board 140, or various kinds of modules (e.g., the 5G antenna module 160) performing various functions, on a side of the front plate 120.

The front plate 120 may be combined with the side bezel structure 110 and the back plate 180 to form the housing. In an embodiment, the front plate 120 may protect an internal component of the electronic device 100, for example, the display 130 against impact coming from the front surface of the electronic device 100. According to various embodiments, the front plate 120 may transmit a light generated from the display 130 or a light incident onto various kinds of sensors (e.g., an image sensor, an iris sensor, a proximity sensor, or the like) disposed on the front surface of the electronic device 100.

The display 130 may be disposed adjacent to one surface of the front plate 120. According to various embodiments, the display 130 may be electrically connected with the printed circuit board 140 to output content (e.g., a text, an image, a video, an icon, a widget, a symbol, or the like) or to receive a touch input (e.g., a touch, a gesture, a hovering, or the like) from the user.

Various electronic components, elements, or printed circuits of the electronic device 100 may be mounted on the printed circuit board 140. For example, an application processor (AP), a communication processor (CP), or an intermediate frequency integrated circuit (IF IC) a communication circuit (e.g., a second communication circuit of FIG. 2), or the like may be mounted on the printed circuit board 140.

According to an embodiment, the printed circuit board 140 may include at least one or more ground regions. The ground region may be understood as a conductive region of a specified size or larger. In an embodiment, the ground region may be used as a ground for electronic components included in the printed circuit board 140, for example, for an operation of a communication circuit. In the disclosure, the printed circuit board 140 may be referred to as a "first PCB", a "main PCB", a "main board", or a "printed board assembly (PBA)".

The battery 150 may convert chemical energy and electrical energy bidirectionally. For example, the battery 150 may convert chemical energy into electrical energy and may supply the converted electrical energy to the display 130 and various components or modules mounted on the printed circuit board 140. According to an embodiment, a power management module for managing the charging and discharging of the battery 150 may be included in the printed circuit board 140.

The 5G antenna module 160 may be disposed adjacent to the printed circuit board 140. For example, the 5G antenna module 160 may be physically connected with at least a portion of the printed circuit board 140. For another example, the 5G antenna module 160 may be disposed adjacent to the printed circuit board 140, and may be electrically connected with electronic components disposed on the printed circuit board 140, for example, a communication module, a communication processor, an application processor, or the like.

According to an embodiment, the 5G antenna module 160 may be disposed adjacent to a periphery of the electronic device 100, for example, a side surface of the housing. For example, in the case where the housing is formed in the shape of a rectangle or substantially a rectangle as illustrated in FIG. 1, the 5G antenna module 160 may be disposed adjacent to each face of the side surface of the housing. For another example, in the case where the housing is formed in the shape of a circle, the 5G antenna module 160 may be disposed to be spaced from the center of the circle as much as a specified distance toward the side surface.

According to an embodiment, the electronic device 100 may include at least one or more 5G antenna modules 160. For example, the electronic device 100 may include a first 5G antenna module **160*a* and a second 5G antenna module 160*b*. In an embodiment, the first 5G antenna module 160*a* and the second 5G antenna module 160*b* may be disposed to face different directions. In an embodiment, the first 5G antenna module 160*a* and the second 5G antenna module 160*b* may receive signals incident in different directions, for example, directions perpendicular to each other or may transmit signals in different directions. According to various embodiments, unlike the example illustrated in FIG. 1, the electronic device 100 may include three or more 5G antenna modules 160**.

According to an embodiment, the 5G antenna module 160 may be a module for communicating with a base station or another electronic device by using the millimeter wave signal. In the disclosure, the millimeter wave signal may be understood, for example, as a radio frequency (RF) signal having a frequency band ranging from 20 GHz to 100 GHz. In the disclosure, the 5G antenna module 160 may be referred to as a "first antenna structure" or a "communication device".

The second support member 170 may be interposed between the back plate 180 and the printed circuit board 140. According to an embodiment, like or as in the first support member 111, the second support member 170 may support or fix the electronic components in the electronic device 100 on a side of the back plate 180.

The back plate 180 may be combined with the side bezel structure 110 and the front plate 120 to form the housing. In an embodiment, the back plate 180 may protect internal components of the electronic device 100 against impact coming from the back surface of the electronic device 100.

In the disclosure, the description given with reference to FIG. 1 may be identically applied to components having the same reference numerals/marks as the components of the electronic device 100 described with reference to FIG. 1.

Figure 2:
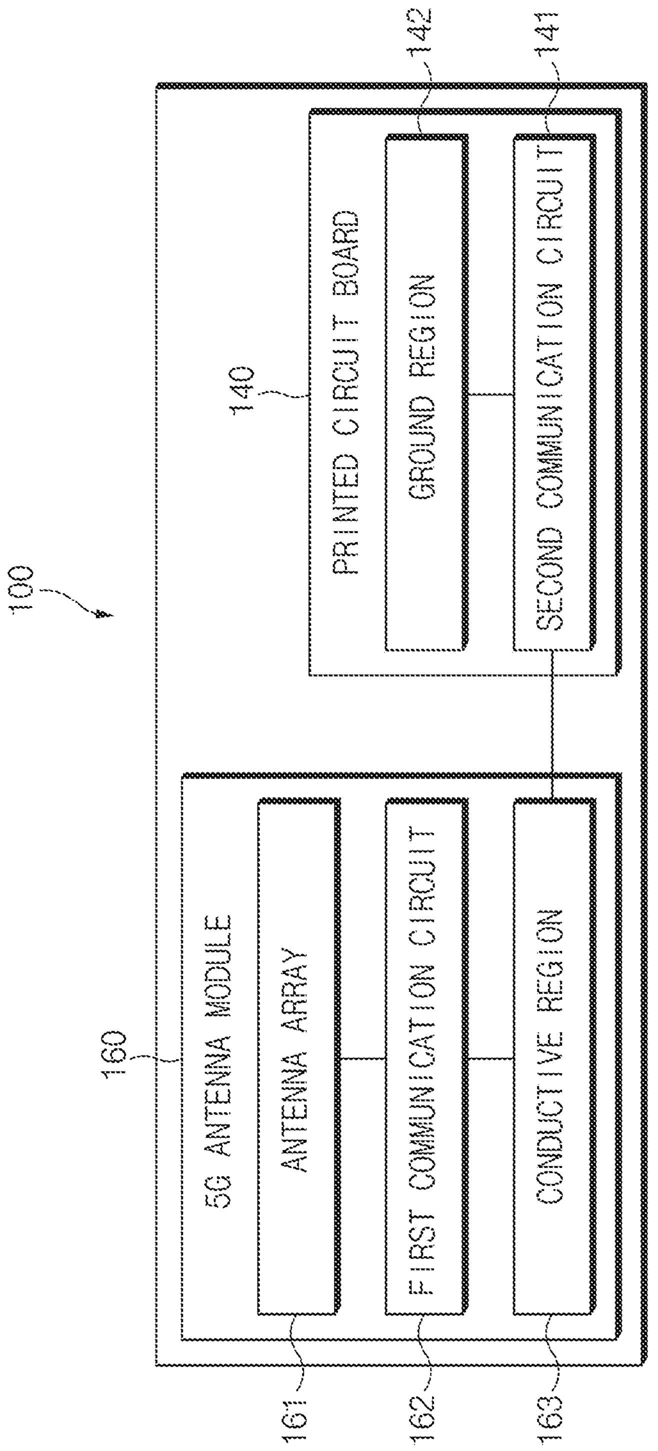
FIG. 2 is a block diagram illustrating an electronic device, according to an embodiment of the disclosure.

FIG. 2 is a block diagram illustrating an electronic device, according to an embodiment of the disclosure.

Referring to FIG. 2, the electronic device 100 may include the 5G antenna module 160 and the printed circuit board 140. According to an embodiment, the 5G antenna module 160 may include an antenna array 161, a first communication circuit 162, and a conductive region 163, and the printed circuit board 140 may include a ground region 142 and a second communication circuit 141.

According to various embodiments, the electronic device 100 may further include a component not illustrated in FIG. 2. For example, the electronic device 100 may further include a processor that is electrically connected with the first communication circuit 162 and/or the second communication circuit 141. In an embodiment, the processor may control the first communication circuit 162 and/or the second communication circuit 141. For another example, as illustrated in FIG. 1, the electronic device 100 may further include the housing including the side bezel structure 110. At least a portion of the housing may be electrically connected with the conductive region 163 or the second communication circuit 141.

According to an embodiment, the antenna array 161 may include a plurality of antenna elements. In various embodiments, the antenna array 161 may form at least one beam for communicating with a base station or an external electronic device by using the plurality of antenna elements. The electronic device 100 may receive or transmit the millimeter wave signal through the at least one beam.

According to an embodiment, the beam that the antenna array 161 forms may have directivity in a specific direction. For example, the beam may have the directivity toward a side surface of the housing, toward the front plate 120, or toward the back plate 180 from the interior of the electronic device 100. When the antenna array 161 forms a beam having directivity in a specific direction, there may be improved communication performance of the electronic device 100 in the specific direction.

According to an embodiment, the first communication circuit 162 may be electrically connected with the antenna array 161 and the conductive region 163, and may feed a power to the antenna array 161 for the purpose of communicating through the millimeter wave signal. For example, the first communication circuit 162 may provide a current of a specified magnitude to each antenna element included in the antenna array 161 through a feed line connected with each antenna element. Each antenna element may be fed with a power by the current, and the antenna elements supplied with the power may form at least one beam. The first communication circuit 162 may receive or transmit the millimeter wave signal by using the at least one beam thus formed. In the disclosure, the first communication circuit 162 may be referred to as a "first wireless communication circuit".

According to an embodiment, the first communication circuit 162 may change a direction of the at least one beam thus formed. For example, the first communication circuit 162 may adjust a phase of a signal radiated from each antenna element. The direction of the beam may be changed based on a phase difference between the signals radiated from the respective antenna elements.

According to an embodiment, the conductive region 163 may be at least one or more regions included in the 5G antenna module 160. In an embodiment, the at least one conductive region 163 may be electrically connected with the first communication circuit 162 and may operate as a ground with regard to the antenna array 161. According to an embodiment, at least a portion of the at least one conductive region 163 may operate as a shield can of the 5G antenna module 160.

According to an embodiment, the at least one conductive region 163 may be electrically connected with the second communication circuit 141 as well as the first communication circuit 162. For example, the at least one conductive region 163 may be at least a portion of a radiator with regard to the second communication circuit 141. In other words, the conductive region 163 may operate as a ground for communicating through the millimeter wave signal with regard to the first communication circuit 162. Meanwhile, with regard to the second communication circuit 141, the conductive region 163 may operate at least a portion of a radiator for transmitting or receiving a signal in a frequency band different from the frequency band of the millimeter wave signal, for example, a radiator of a legacy antenna.

According to an embodiment, the second communication circuit 141 may be a communication circuit that is included in the printed circuit board 140 and is independent of the first communication circuit 162. For example, the first communication circuit 162 may be a component for communicating by using a signal (e.g., a millimeter wave signal) in an ultrahigh frequency band, for example, ranging from 6 GHz to 100 GHz, while the second communication circuit 141 may be a component for communicating by using a signal in a relatively low frequency band, for example, a signal of 400 MHz or higher and 6 GHz or lower. According to various embodiments, the second communication circuit 141 may be a communication circuit for Wi-Fi or Bluetooth communication. In the disclosure, the second communication circuit 141 may be referred to as a "second wireless communication circuit".

According to an embodiment, the second communication circuit 141 may feed a power to an electrical path at least including the conductive region 163. The electrical path may include, for example, the conductive region 163 and a conductive element extended from the conductive region 163. For another example, the electrical path may include the conductive region 163 and at least a portion of a side member (e.g., the side bezel structure 110 of FIG. 1) of a housing, which is electrically connected with the conductive region 163.

According to an embodiment, the second communication circuit 141 may be configured to transmit or receive a signal in a specified frequency band based on the electrical path supplied with the power and the ground region 142 included in the printed circuit board 140. The specified frequency band may be a frequency band different from the frequency band of the millimeter wave signal, for example, a frequency band ranging from 400 MHz to 6 GHz.

According to an embodiment, the ground region 142 may be a conductive region of a specified size or larger, which is included in the printed circuit board 140.

In the disclosure, the description given with reference to FIG. 2 may be identically applied to components having the same reference numerals/marks as the components of the electronic device 100 described with reference to FIG. 2.

Figure 3A:
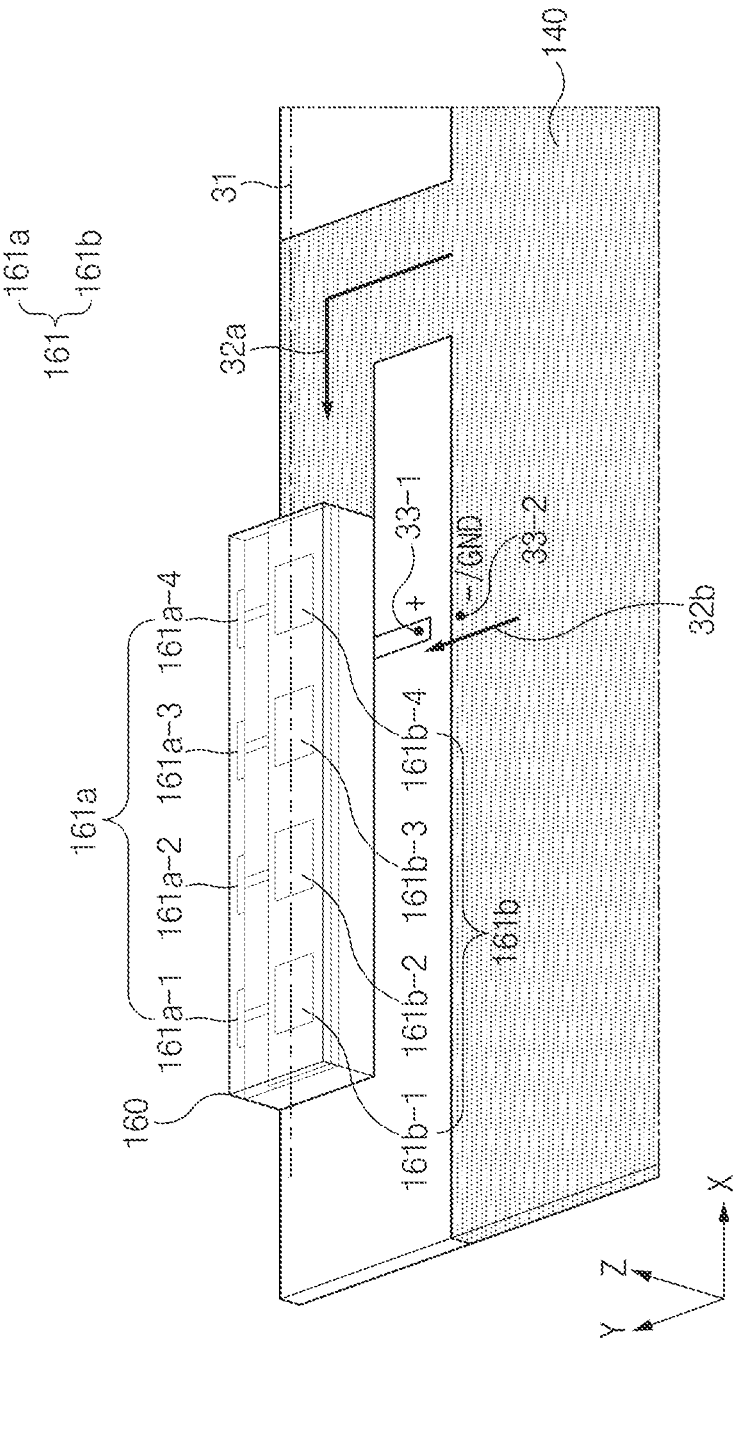
FIG. 3A is an inner perspective view of an electronic device in which a legacy antenna is implemented by using a 5G antenna module, according to an embodiment of the disclosure.

FIG. 3A is an inner perspective view of an electronic device in which a legacy antenna is implemented by using a 5G antenna module, according to an embodiment of the disclosure.

Figure 3B:
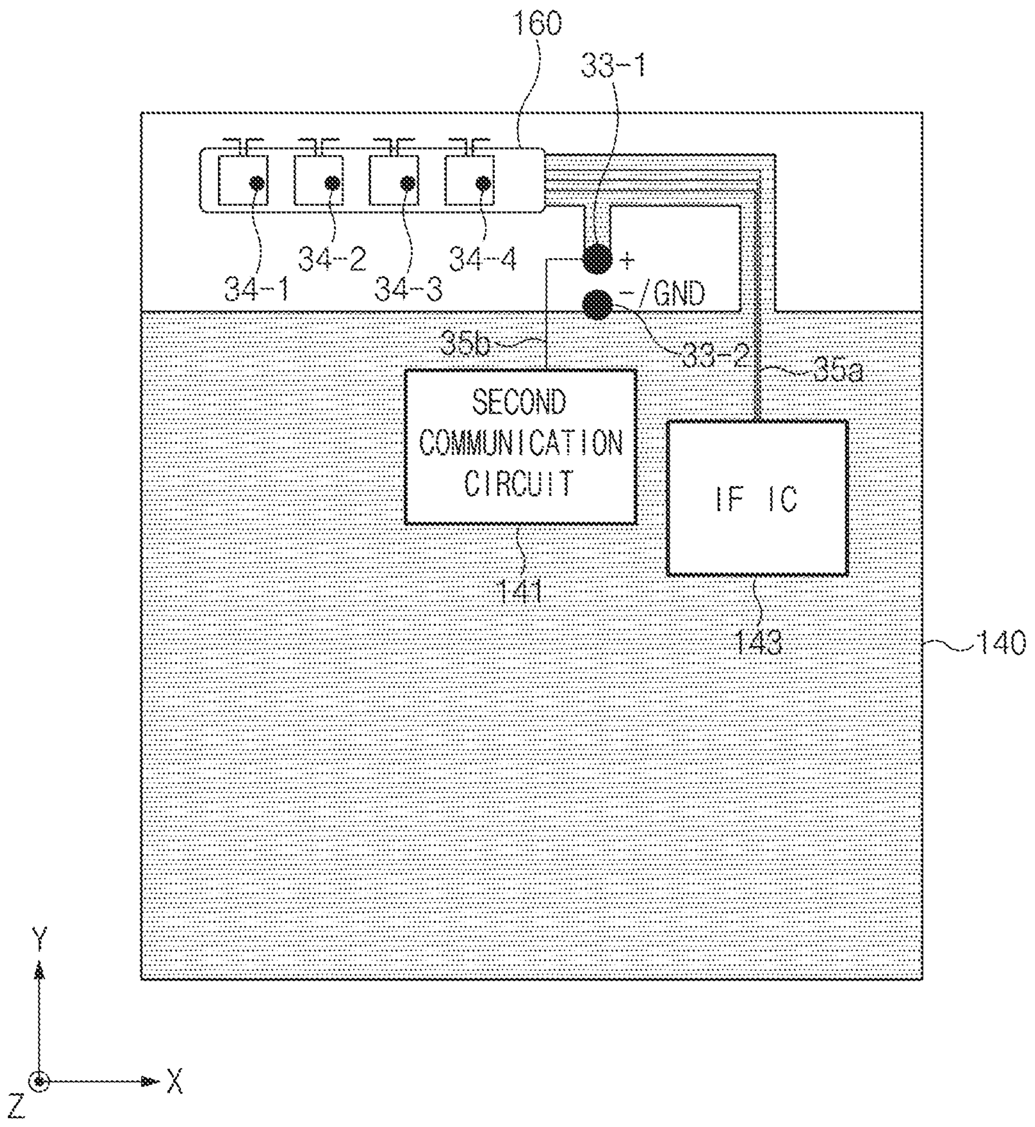
FIG. 3B is an inner front view of an electronic device in which a legacy antenna is implemented by using a 5G antenna module, according to an embodiment of the disclosure.

FIG. 3B is an inner front view of an electronic device in which a legacy antenna is implemented by using a 5G antenna module, according to an embodiment of the disclosure.

Referring to FIGS. 3A and 3B, the electronic device 100 may include the 5G antenna module 160, and the 5G antenna module 160 and the printed circuit board 140 may be electrically and/or physically connected. For example, the 5G antenna module 160 may be physically connected with at least a portion of the printed circuit board 140 as illustrated in FIG. 3A or 3B. For another example, the 5G antenna module 160 may not be physically directly connected with at least a portion of the printed circuit board 140 but may be electrically connected with the printed circuit board 140 through a plurality of conducting wires.

According to an embodiment, the 5G antenna module 160 may include the antenna array 161. In an embodiment, the antenna array 161 may include a plurality of antenna arrays, for example, a first antenna array 161*a* and a second antenna array 161*b*. According to an embodiment, the first antenna array 161*a* may include a plurality of patch antenna elements 161*a*-1, 161*a*-2, 161*a*-3, and 161*a*-4, and the second antenna array 161*b* may include a plurality of dipole antenna elements 161*b*-1, 161*b*-2, 161*b*-3, and 161*b*-4.

According to an embodiment, the printed circuit board 140 may include the second communication circuit 141 and an IF IC 143. In an embodiment, the IF IC 143 may convert an RF signal received from a first communication circuit into a signal in an intermediate frequency signal; alternatively, the IF IC 143 may convert a signal in an intermediate frequency band into an RF signal and may provide the RF signal to the first communication circuit (e.g., the first communication circuit 162 of FIG. 2).

According to an embodiment, the IF IC 143 may provide a feed signal to the first communication circuit such that the first communication circuit feeds a power to the antenna array 161 to perform communication using the millimeter wave signal. In an embodiment, the first communication circuit may provide the feed signal to a feed point included in the antenna array 161, for example, a first feed point 34-1, a second feed point 34-2, a third feed point 34-3, or a fourth feed point 34-4. According to an embodiment, the feed point 34-1, 34-2, 34-3, or 34-4 may be a feed point of a patch antenna element 161*a*-1, 161*a*-2, 161*a*-3, or 161*a*-4. Although not illustrated in FIG. 3B, the 5G antenna module 160 may include a feed point for a dipole antenna element 161*b*-1, 161*b*-2, 161*b*-3, or 161*b*-4.

According to an embodiment, the printed circuit board 140 may include at least one feed point 33-1 and a ground point 33-2 for a legacy antenna. In an embodiment, the legacy antenna may operate as an antenna that is supplied with a power from the second communication circuit 141 at the feed point 33-1 and transmits or receives a signal in a relatively low frequency band based on an electrical path including the feed point 33-1 and the ground point 33-2. An example is illustrated in FIG. 3A as the feed point 33-1 and the printed circuit board 140 are electrically or physically separated, but it may be understood that the feed point 33-1 and the printed circuit board 140 are electrically or physically connected through at least one conducting wire, for example, a second conducting wire 35*b* as illustrated in FIG. 3B.

According to an embodiment, the feeding of a power from the IF IC 143 to the 5G antenna module 160 and the feeding of a power from the second communication circuit 141 to the legacy antenna may be made separately. For example, as illustrated in FIG. 3A, the feeding of a power to the 5G antenna module 160 may be made in a direction of a first arrow 32*a*, and the feeding of a power to the legacy antenna may be made in a direction of an arrow 32*b*. In an embodiment, as illustrated in FIG. 3B, the feeding of a power to the 5G antenna module 160 may be made through a first conducting wire 35*a*, and the feeding of a power to the legacy antenna may be made through the second conducting wire 35*b*.

According to an embodiment, the first conducting wire 35*a* may electrically connect the first communication circuit 162 included in the 5G antenna module 160 and the IF IC 143, and the second conducting wire 35*b* may electrically connect at least one conductive region included in the 5G antenna module 160 and the second communication circuit 141.

Figure 3C:
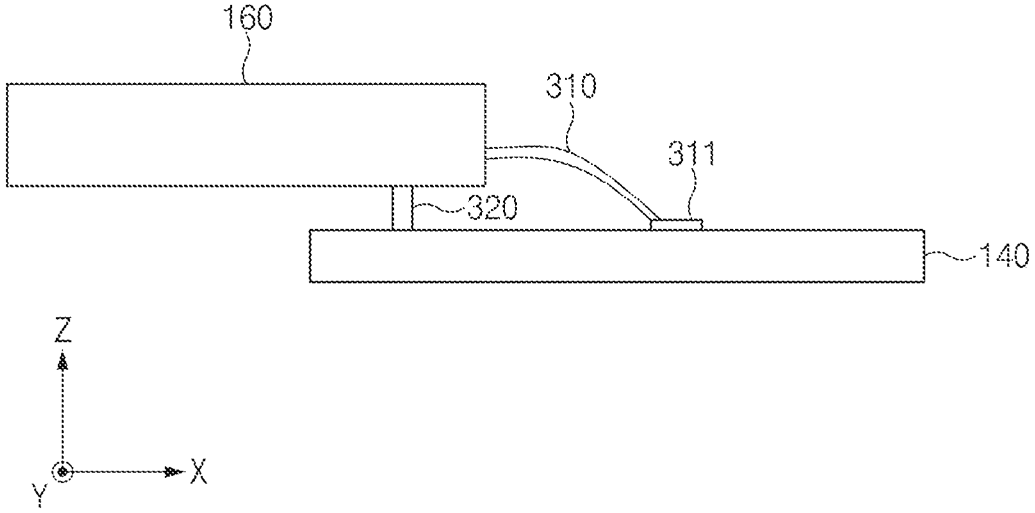
FIGS. 3C and 3D are inner side views of an electronic device in which a legacy antenna is implemented by using a 5G antenna module, according to various embodiments of the disclosure.
Figure 3D:
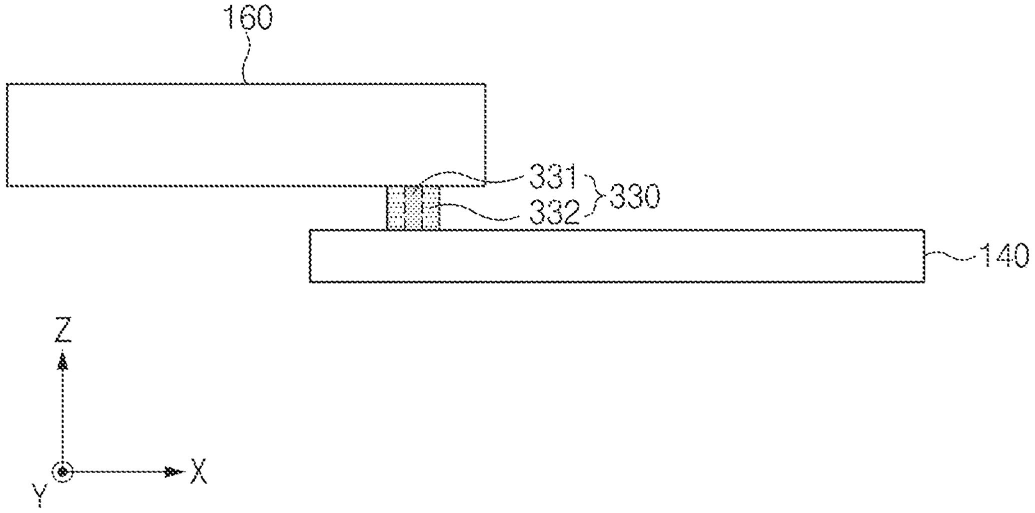

FIGS. 3C and 3D are inner side views of an electronic device in which a legacy antenna is implemented by using a 5G antenna module, according to various embodiments of the disclosure. FIGS. 3C and 3D are cross-sectional views of an electronic device taken along a first line 31 illustrated in FIG. 3A.

Referring to FIG. 3C, the 5G antenna module 160 and the printed circuit board 140 may be connected through a first connection member 310 and a second connection member 320. In an embodiment, the first connection member 310 may transfer a feed signal of an IF IC (e.g., the IF IC 143 of FIG. 3B) to a first communication circuit (e.g., the first communication circuit 162 of FIG. 2), and the second connection member 320 may transfer a feed signal of a second communication circuit (e.g., the second communication circuit 141 of FIG. 3B) to a conductive region (e.g., the conductive region 163 of FIG. 2) of the 5G antenna module 160.

According to an embodiment, the first connection member 310 may be a flexible printed circuit (FPC) or a flexible printed circuit board (FPCB). The first connection member 310 may be electrically connected with a first conducting wire (e.g., the first conducting wire 35*a*) disposed on the printed circuit board 140 through a connector 311 included in the printed circuit board 140. The first connection member 310 may electrically connect the printed circuit board 140 and the first communication circuit of the 5G antenna module 160.

According to an embodiment, the second connection member 320 may be implemented with a C-clip, a screw, a pogo pin, foam, or a plate-shaped spring. The second connection member 320 may electrically connect the printed circuit board 140 and the conductive region of the 5G antenna module 160.

Referring to FIG. 3D, unlike the example illustrated in FIG. 3C, the 5G antenna module 160 and the printed circuit board 140 may be connected through one connection member 330. According to an embodiment, the connection member 330 may be of a dual structure. For example, the connection member 330 may be divided into a central portion 331 and an outer portion 332, and the central portion 331 and the outer portion 332 may be electrically spaced from each other.

In an embodiment, the central portion 331 may transfer a feed signal of an IF IC (e.g., the IF IC 143 of FIG. 3B) to a first communication circuit (e.g., the first communication circuit 162 of FIG. 2), and the outer portion 332 may transfer a feed signal of a second communication circuit (e.g., the second communication circuit 141 of FIG. 3B) to the conductive region of the 5G antenna module 160. According to another embodiment, the central portion 331 may transfer the feed signal of the second communication circuit to the conductive region of the 5G antenna module 160, and the outer portion 332 may transfer the feed signal of the IF IC to the first communication circuit.

Figure 4A:
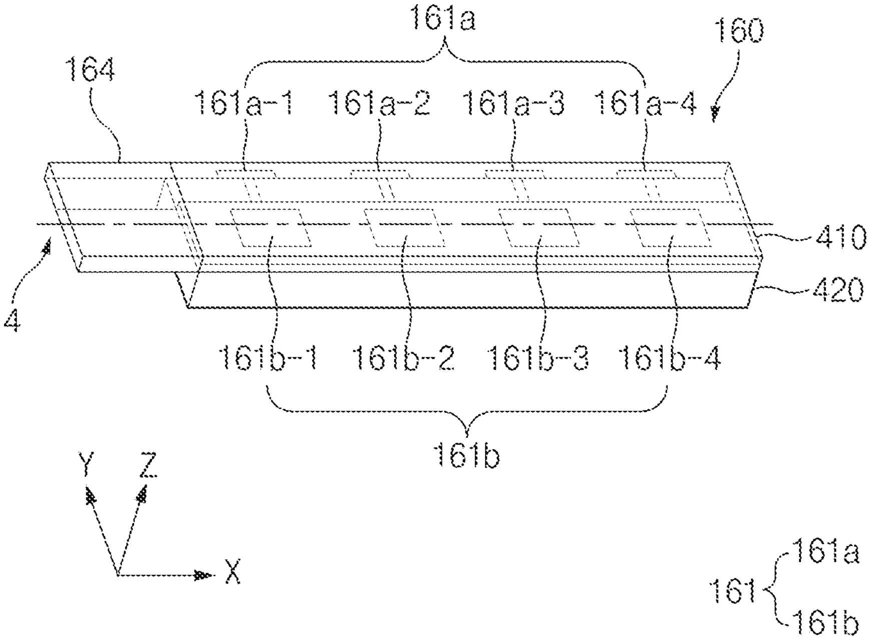
FIG. 4A is a perspective view of a 5G antenna module, according to an embodiment of the disclosure.

FIG. 4A is a perspective view of a 5G antenna module, according to an embodiment of the disclosure.

Referring to FIG. 4A, the 5G antenna module 160 may include a layer structure 410, a shield can 420, the antenna array 161, and a non-conductive region 164. According to various embodiments, the 5G antenna module 160 may not include a part of the components illustrated in FIG. 4A or may further include a component not illustrated in FIG. 4A. For example, the 5G antenna module 160 may include a first communication circuit (e.g., the first communication circuit 162 of FIG. 2) disposed in the shield can 420.

The layer structure 410 may be implemented, for example, with a printed circuit board. The printed circuit board may be understood as a sub printed circuit board separated from the printed circuit board 140 of FIG. 3A.

According to an embodiment, the layer structure 410 may include a plurality of layers. For example, the layer structure 410 may include a layer where the antenna array 161 is disposed or a layer where a conductive region (e.g., the conductive region 163 of FIG. 2) is disposed. In the disclosure, the layer structure 410 may be referred to as an "antenna structure", and the sub printed circuit board may be referred to as a "second printed circuit board".

The shield can 420 may be understood as at least a portion of the conductive region 163 included in the 5G antenna module 160. In an embodiment, the shield can 420 may protect the first communication circuit 162 disposed therein against an external electromagnetic wave. For example, a plurality of electronic components may be disposed in the electronic device 100, for example, on the printed circuit board 140, and the plurality of electronic components may emit electromagnetic waves while operating. The shield can 420 may block the electromagnetic waves such that the emitted electromagnetic waves have no influence on an operation of the first communication circuit 162.

The antenna array 161 may include the plurality of antenna elements 161_a__1, 161_a__2, 161_a__3, 161_a__4, 161_b__1, 161_b__2, 161_b__3, and 161_b__4. For example, the antenna array 161 may include the plurality of dipole antenna elements 161_a__1, 161_a__2, 161_a__3, and 161_a__4 and/or the plurality of patch antenna elements 161_b__1, 161_b__2, 161_b__3, and 161_b__4. In an embodiment, the antenna array 161_b_ including the patch antenna element 161_b__1, 161_b__2, 161_b__3, or 161_b__4 may radiate the millimeter wave signal in a direction different from a direction in which the antenna array 161_a_ including the dipole antenna element 161_a__1, 161_a__2, 161_a__3, or 161_a__4 radiates the millimeter wave signal. For example, the antenna array 161_a_ including the dipole antenna element 161_a__1, 161_a__2, 161_a__3, or 161_a__4 may radiate the millimeter wave signal in a Y-axis direction (e.g., toward a side surface of a housing), and the antenna array 161_b_ including the patch antenna element 161_b__1, 161_b__2, 161_b__3, or 161_b__4 may radiate the millimeter wave signal in a Z-axis direction (e.g., toward a front surface or a back surface of a housing).

The non-conductive region 164 may be attached to one surface of the layer structure 410. In an embodiment, the non-conductive region 164 may be used as a means for fixing or supporting the 5G antenna module 160.

Figure 4B:
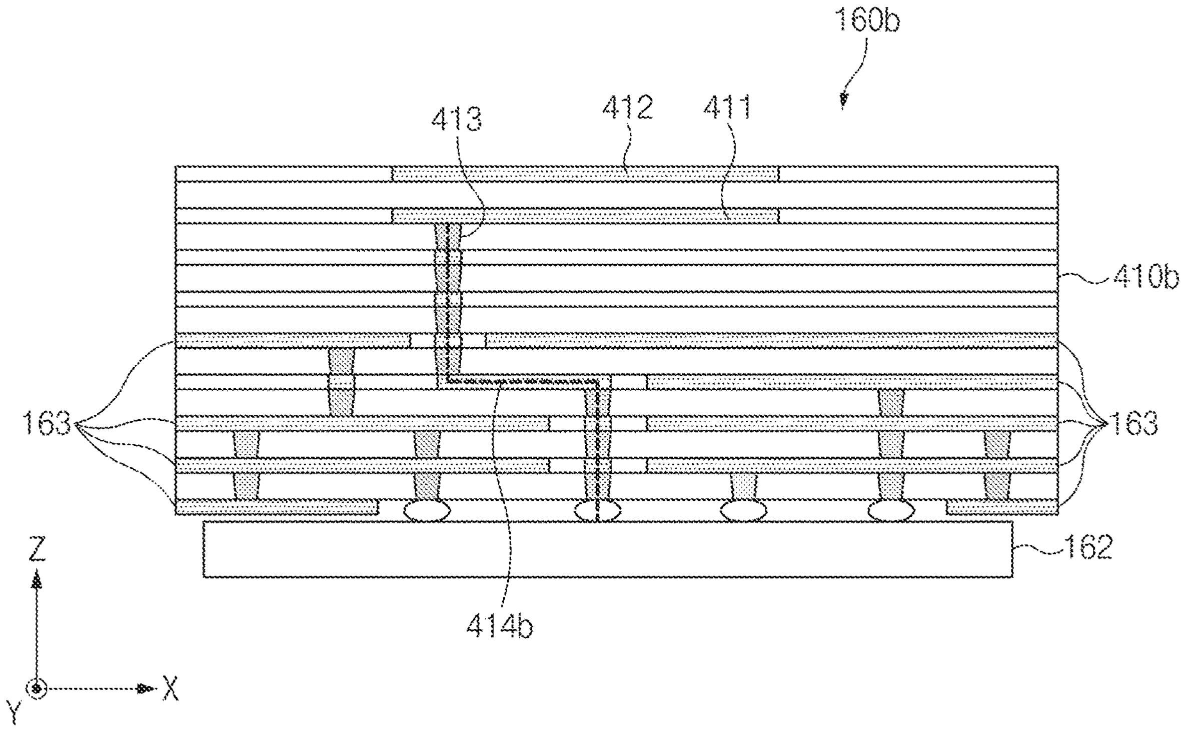
FIGS. 4B and 4C are side views of a 5G antenna module, according to various embodiments of the disclosure.
Figure 4C:
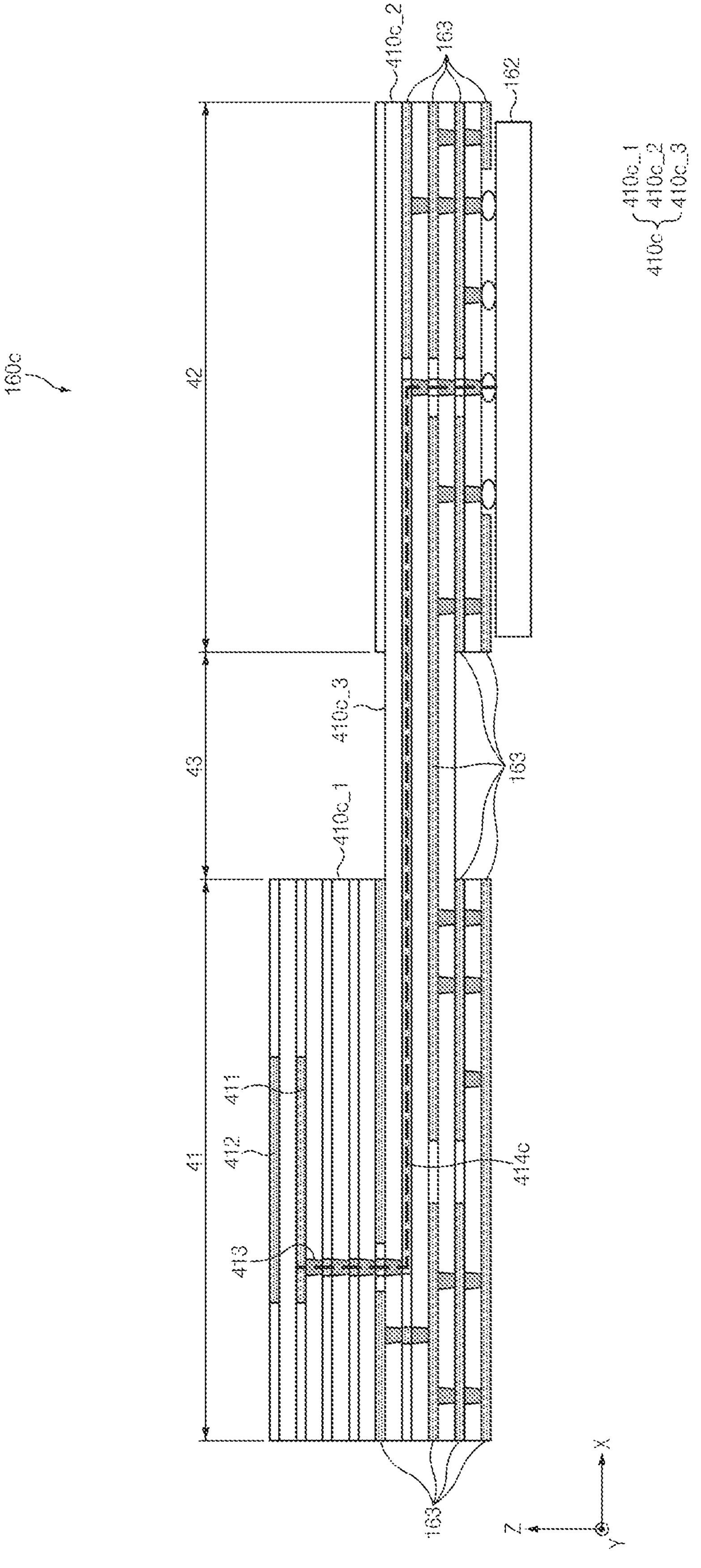

FIGS. 4B and 4C are cross-section views of a 5G antenna module, according to various embodiments of the disclosure. FIGS. 4B and 4C may illustrate a portion of a cross section of the 5G antenna module 160 taken along a first line 4 of FIG. 4A.

Referring to FIG. 4B, the 5G antenna module 160_b_ may include a layer structure 410_b_ and the first communication circuit 162. According to various embodiments, the 5G antenna module 160_b_ may further include a component not illustrated in FIG. 4B. For example, the 5G antenna module 160_b_ may further include the shield can 420 or a non-conductive region (e.g., the non-conductive region 164 of FIG. 4A) as illustrated in FIG. 4A. According to an embodiment, the 5G antenna module 160_b_ may be mounted on at least one sub printed circuit board. For example, the layer structure 410 may be formed on the sub printed circuit board, and the first communication circuit 162 may be attached to one surface of the sub printed circuit board. In this case, the first communication circuit 162 and a conductive patch 411 of an antenna element (e.g., the patch antenna element 161_b_-1 of FIG. 4A) may be mounted at the same sub printed circuit board.

According to an embodiment, the layer structure 410 may include a plurality of layers. For example, the layer structure 410_b_ may include at least one layer including the conductive patch 411 or at least one layer including a coupling conductive patch 412. For another example, the layer structure 410_b_ may include at least one layer including the at least one conductive region 163.

According to an embodiment, the conductive patch 411 may be a conductive material that is supplied with a power from the first communication circuit 162 such that electromagnetic resonance occurs. According to an embodiment, the coupling conductive patch 412 that is a conductive material may guide a direction of an electromagnetic signal radiated from the conductive patch 411 supplied with the power.

According to an embodiment, the feeding of a power to the conductive patch 411 may be made through a plurality of vias 413 that are formed between a plurality of layers in the layer structure 410_b_. In an embodiment, the vias 413 may be formed as a portion of the layer structure 410_b_ and may be understood as a path capable of passing through respective layers. For example, the conductive patch 411 and the first communication circuit 162 may be electrically connected through the vias 413 and a feed line 414_b_ including the at least one conductive region 163, and the conductive patch 411 may be supplied with a power through the feed line 414_b_. When the first communication circuit 162 feeds a power to the conductive patch 411, the electronic device 100 may perform communication using the millimeter wave signal.

According to an embodiment, the at least one conductive region 163 may be electrically connected with the first communication circuit 162 and may operate as a ground with regard to the first communication circuit 162 and the conductive patch 411. According to an embodiment, the at least one conductive region 163 may be supplied with a power from a second communication circuit (e.g., the second communication circuit 141 of FIG. 2) and may operate as at least a portion of a radiator for transmitting or receiving a signal in a specified frequency band with regard to the second communication circuit. In an embodiment, the at least one conductive region 163 may be electrically connected with the outside of the 5G antenna module 160_b_, for example, the second communication circuit included in the printed circuit board 140 and may be supplied with a power from the second communication circuit 141.

Referring to FIG. 4C, a 5G antenna module 160_c_ may include a plurality of layer structures 410_c_ and the first communication circuit 162. For example, the 5G antenna module 160_c_ may include a first layer structure 410_c__1 disposed in a first region 41, a second layer structure 410_c__2 disposed in a second region 42, a third layer structure 410_c__3 disposed in a third region 43, and the first communication circuit 162. In FIG. 4C, with regard to the description given with reference to FIG. 4B, additional description will be omitted to avoid redundancy. For example, the description associated with components having the same reference numerals will be omitted to avoid redundancy.

According to an embodiment, each of the layer structures 410_c__1, 410_c__2, and 410_c__3 may be implemented with a sub printed circuit board or a flexible printed circuit board. For example, the first layer structure 410_c__1 may be implemented with a first sub printed circuit board, and the second layer structure 410_c__2 may be implemented with a second sub printed circuit board. The third layer structure 410_c__3 connecting the first layer structure 410_c__1 and the second layer structure 410_c__2 may be implemented with a flexible printed circuit board. In an embodiment, the first communication circuit 162 and the conductive patch 411 of an antenna element (e.g., the patch antenna element 161*b*-1 of FIG. 4A) may be mounted at different sub printed circuit boards.

According to an embodiment, the antenna array 161 and a portion of the at least one conductive region 163 may be implemented in the first layer structure 410*c*_1, for example, the first sub printed circuit board. For example, as illustrated in FIG. 4C, the conductive patch 411 and a portion of the conductive region 163 may be implemented in the first layer structure 410*c*_1 disposed in the first region 41. According to an embodiment, the remaining portion of the at least one conductive region 163 and the first communication circuit 162 may be implemented in the second layer structure 410*c*_2, for example, the second sub printed circuit board. For example, as illustrated in FIG. 4C, the remaining portion of the conductive region 163 and the first communication circuit 162 may be implemented in the second layer structure 410*c*_2 disposed in the second region 42.

The flexible printed circuit board may electrically connect the antenna array 161 and the first communication circuit 162 and may electrically connect the portion and the remaining portion of the at least one conductive region 163. For example, the flexible printed circuit board may electrically connect the conductive patch 411 and the first communication circuit 162 as illustrated in FIG. 4C. For another example, the flexible printed circuit board may electrically connect a portion of the conductive region 163 implemented in the first layer structure 410*c*_1 and another portion of the conductive region 163 implemented in the second layer structure 410*c*_2 as illustrated in FIG. 4C. In an embodiment, the flexible printed circuit board may include a plurality of conducting wires for the electrical connections. As such, the conductive patch 411 may be supplied with a power from the first communication circuit 162 through a feed line 414*c*, and a portion of the at least one conductive region 163 included in the first sub printed circuit board may be supplied with a power from the second communication circuit 141 through the second sub printed circuit board and the flexible printed circuit board.

Figure 5:
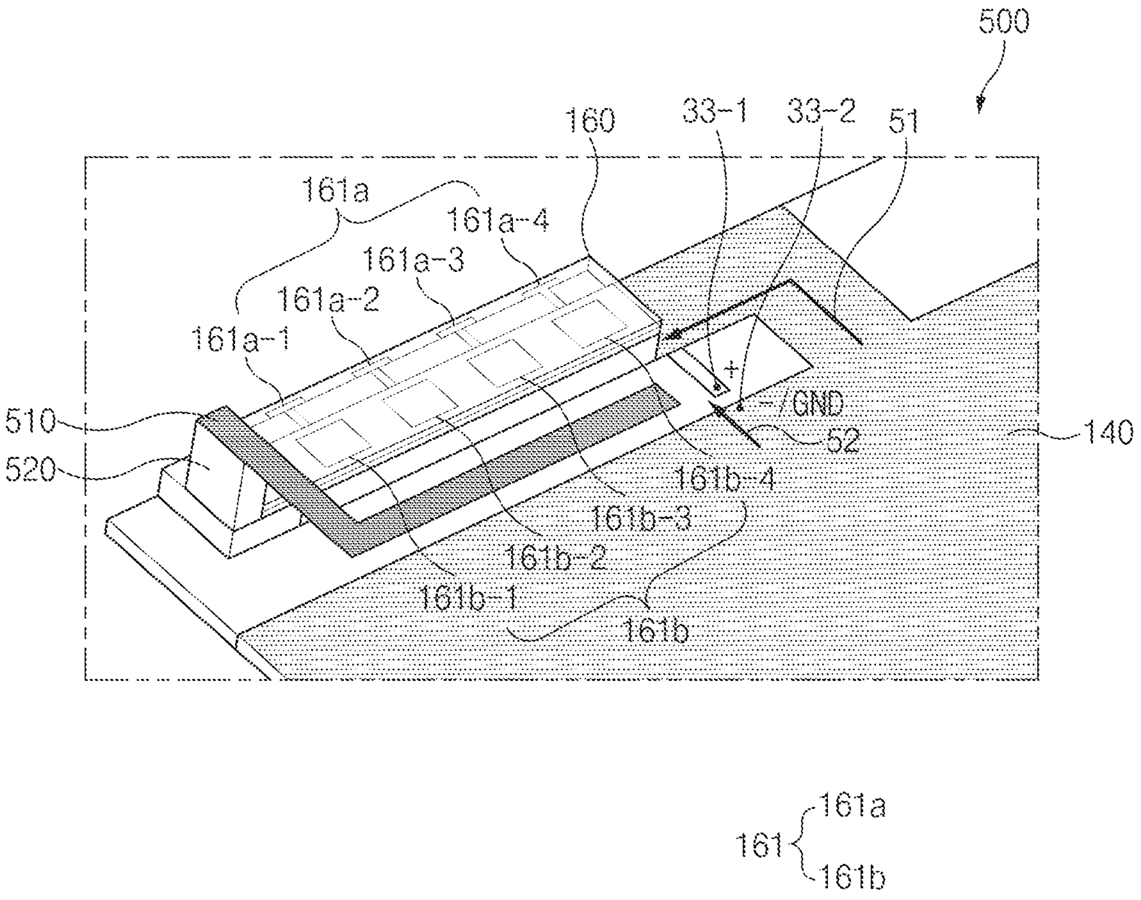
FIG. 5 is an inner perspective view of an electronic device further including a conductive element, according to an embodiment of the disclosure.

FIG. 5 is an inner perspective view of an electronic device further including a conductive element, according to an embodiment of the disclosure.

Referring to FIG. 5, an electronic device 500 may include the printed circuit board 140 and the 5G antenna module 160. The electronic device 500 may perform communication using the millimeter wave signal through the antenna array 161 included in the 5G antenna module 160. Also, the electronic device 500 may perform communication using a signal in a specified frequency band, for example, ranging from 400 MHz to 6 GHz through an electrical path at least including a conductive region (e.g., the conductive region 163 of FIG. 2) included in the 5G antenna module 160.

In an embodiment, the feeding of a power to the antenna array 161 may be made in a direction of a first arrow 51, and the feeding of a power to the conductive region 163 may be made in a direction of a second arrow 52. An example is illustrated in FIG. 5 as the feed point 33-1 and the printed circuit board 140 are electrically or physically separated, but it may be understood that the feed point 33-1 and the printed circuit board 140 are electrically or physically connected through at least one conducting wire, for example, the second conducting wire 35*b* as illustrated in FIG. 3B. In FIG. 5, with regard to the description given with reference to FIGS. 1 and 4A to 4C, additional description will be omitted to avoid redundancy.

According to an embodiment, the electronic device 500 may further include a conductive element 510 extended from the conductive region of the 5G antenna module 160 and/or a connection member 520 connecting the conductive region and the conductive element 510. According to an embodiment, the connection member 520 may be a C-clip formed of a conductive material. According to various embodiments, a length, a shape, or a direction of the conductive element 510 is not limited to the example illustrated in FIG. 5.

According to an embodiment, the conductive element 510 and the connection member 520 may be at least a portion of an electrical path that is supplied with a power by a second communication circuit (e.g., the second communication circuit 141 of FIG. 2). The electronic device 500 may feed a power to an electrical path that includes at least one conductive region included in the 5G antenna module 160, the conductive element 510, and the connection member 520. The electronic device 500 may perform communication using a signal in a specified frequency band, for example, a Sub-6 GHz band based on the electrical path supplied with the power.

According to an embodiment, a length of the conductive element 510 may be set based on a frequency band of a signal that is used for the electronic device 500 to communicate. For example, because a relatively long electrical path is required when the electronic device 500 communicates by using a signal of a relatively low frequency, the conductive element 510 may be designed to be relatively long. For another example, because a relatively short electrical path is required when the electronic device 500 communicates by using a signal of a relatively high frequency, the conductive element 510 may be designed to be relatively short.

Figure 6:
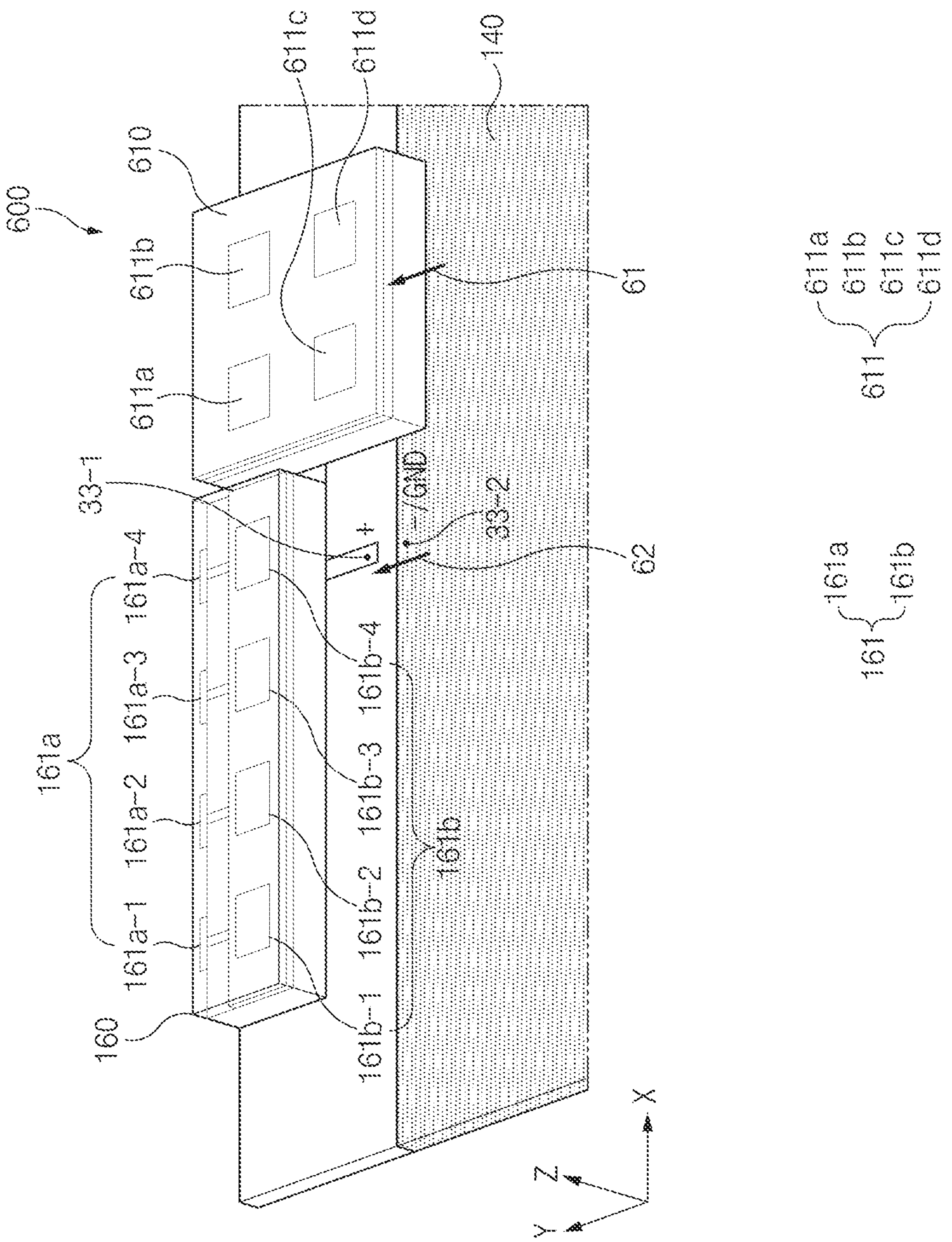
FIG. 6 is an inner perspective view of an electronic device including a plurality of 5G antenna modules, according to an embodiment of the disclosure.

FIG. 6 is an inner perspective view of an electronic device including a plurality of 5G antenna modules, according to an embodiment of the disclosure.

Referring to FIG. 6, an electronic device 600 may include a plurality of 5G antenna modules 160 and 610, for example, a first 5G antenna module 160 and a second 5G antenna module 610. The electronic device 600 may perform communication using a millimeter wave signal through antenna arrays 161 and 611 included in the plurality of 5G antenna modules 160 and 610. Also, the electronic device 600 may perform communication using a signal in a specified frequency band, for example, ranging from 400 MHz to 6 GHz through an electrical path at least including a conductive region (e.g., the conductive region 163 of FIG. 2) included in at least one 5G antenna module (e.g., the first 5G antenna module 160).

In an embodiment, the feeding of a power to the antenna arrays 161 and 611 may be made in a direction of a first arrow 61, and the feeding of a power to the conductive region may be made in a direction of a second arrow 62. An example is illustrated in FIG. 6 as the feed point 33-1 and the printed circuit board 140 are electrically or physically separated, but it may be understood that the feed point 33-1 and the printed circuit board 140 are electrically or physically connected through at least one conducting wire, for example, the second conducting wire 35*b* as illustrated in FIG. 3B. In FIG. 6, with regard to the description given with reference to FIGS. 1 and 4A to 4C, additional description will be omitted to avoid redundancy.

The second 5G antenna module 610 may be identical or similar to the first 5G antenna module 160. For example, the second 5G antenna module 610 may include a plurality of antenna elements 611*a*, 611*b*, 611*c*, and 611*d*. The plurality of antenna elements 611*a*, 611*b*, 611*c*, and 611*d* may be, for example, a patch antenna element or a dipole antenna element. The second 5G antenna module 610 may be supplied with a feed signal from an IF IC (e.g., the IF IC 143 of FIG. 3B) included in the printed circuit board 140. The antenna array 611 included in the second 5G antenna module 610 may be supplied with a power from a first communication circuit (e.g., the first communication circuit 162 of FIG. 2) or a third communication circuit separated from the first communication circuit, and the electronic device 600 may perform communication using the millimeter wave signal.

According to an embodiment, at least one conductive region (not illustrated) included in the second 5G antenna module 610 may be electrically connected with the conductive region included in the first 5G antenna module 160. In this case, a second communication circuit (e.g., the second communication circuit 141 of FIG. 2) may feed a power to an electrical path including the conductive region included in the first 5G antenna module 160 and the at least one conductive region included in the second 5G antenna module 610. The electronic device 600 may perform communication using a signal in a specified frequency band, for example, a Sub-6 GHz band based on the electrical path supplied with the power.

Figure 7A:
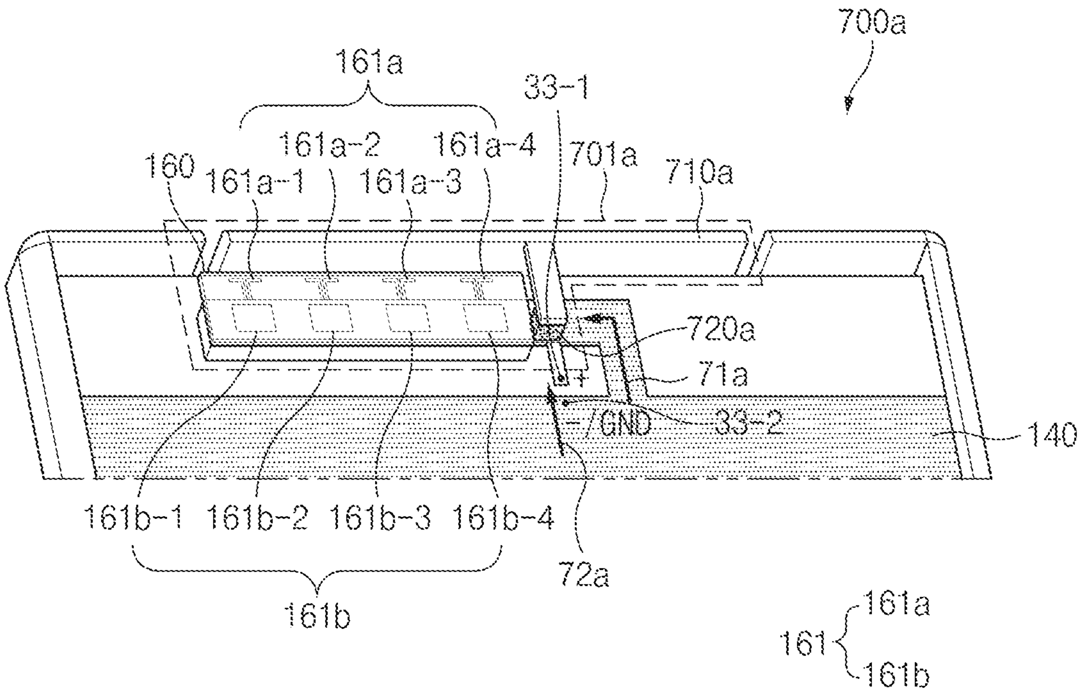
FIGS. 7A and 7B are inner perspective views of an electronic device including a legacy antenna that uses a portion of a 5G antenna module as an additional radiator, according to various embodiments of the disclosure.
Figure 7B:
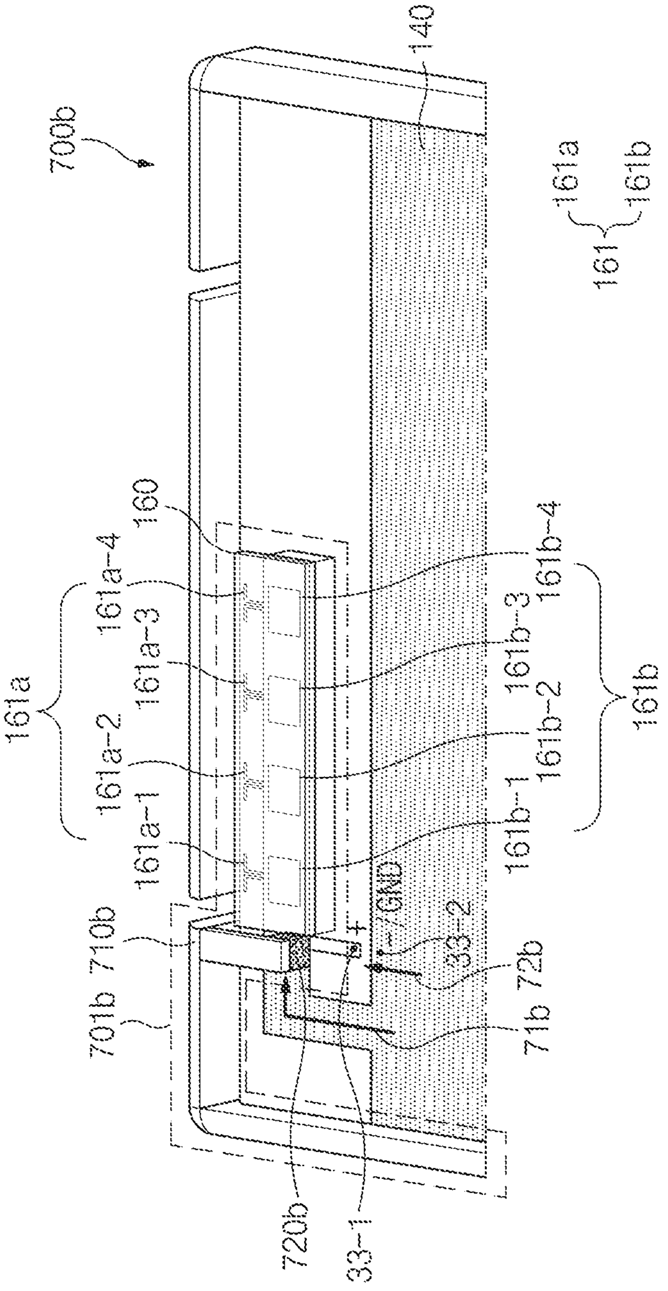

FIGS. 7A and 7B are inner perspective views of an electronic device including a legacy antenna that uses a portion of a 5G antenna module as an additional radiator, according to various embodiments of the disclosure.

Referring to FIGS. 7A and 7B, an electronic device 700*a* or 700*b* may include the 5G antenna module 160, the printed circuit board 140, and a side member 710*a* or 710*b* of a housing. The electronic device 700*a* or 700*b* may perform communication using the millimeter wave signal through the antenna array 161 included in the 5G antenna module 160. Also, the electronic device 700*a* or 700*b* may perform communication using a signal in a specified frequency band, for example, ranging from 400 MHz to 6 GHz through an electrical path at least including a conductive region (e.g., the conductive region 163 of FIG. 2) included in the 5G antenna module 160.

In an embodiment, the feeding of a power to the antenna array 161 may be made in a direction of a first arrow 71*a* or 71*b*, and the feeding of a power to the conductive region may be made in a direction of a second arrow 72*a* or 72*b*. Examples are illustrated in FIGS. 7A and 7B as the feed point 33-1 and the printed circuit board 140 are electrically or physically separated, but it may be understood that the feed point 33-1 and the printed circuit board 140 are electrically or physically connected through at least one conducting wire, for example, the second conducting wire 35*b* as illustrated in FIG. 3B. In FIGS. 7A and 7B, with regard to the description given with reference to FIGS. 1 and 4A to 4C, additional description will be omitted to avoid redundancy.

According to an embodiment, the side member 710*a* or 710*b* of the housing may be, for example, at least a portion of the side bezel structure 110 illustrated in FIG. 1. The side members 710*a* and 710*b* may be formed of a conductive material. According to an embodiment, the side member 710*a* or 710*b* may have at least one segment, and the side member 710*a* or 710*b* may be partitioned into a plurality of regions by the segment. The plurality of partitioned regions may be physically or electrically separated from each other. In an embodiment, the side member 710*a* or 710*b* may be electrically connected with the conductive region of the 5G antenna module 160. For example, the electronic device 700*a* or 700*b* may further include a connection member 720*a* or 720*b*, and the connection member 720*a* or 720*b* may electrically connect the side member 710*a* or 710*b* and the printed circuit board 140. As illustrated in FIGS. 3A to 3D, because the conductive region of the 5G antenna module 160 is electrically connected with at least a portion of the printed circuit board 140, the side member 710*a* or 710*b* may be electrically connected with the conductive region of the 5G antenna module 160.

According to an embodiment, the side member 710*a* or 710*b* and the conductive region of the 5G antenna module 160 may form at least one electrical path. The electrical path may include, for example, an electrical path branched toward the conductive region from a point where the connection member 720*a* or 720*b* is disposed and an electrical path branched toward the side member 710*a* or 710*b* from a point where the connection member 720*a* or 720*b* is disposed. The electronic device 700*a* or 700*b* may feed a power to the electrical path through a second communication circuit (e.g., the second communication circuit 141 of FIG. 2) and may perform communication using a signal in a specified frequency band, for example, a Sub-6 GHz band through the electrical path supplied with the power. In an embodiment, in the electronic device 700*a* (or the electronic device 700*b*), a first region 701*a* (or a second region 701*b*) including the electrical path may form electromagnetic resonance through power feeding, and the first region 701*a* (or the second region 701*b*) may operate as a legacy antenna for transmitting or receiving a signal in the specified frequency band.

Figure 7C:
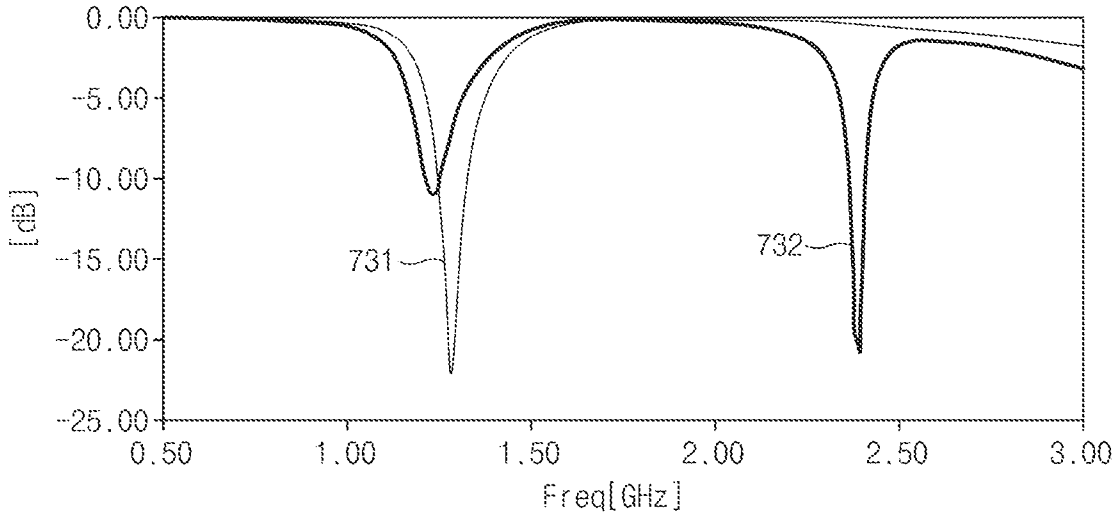
FIG. 7C illustrates a radiation simulation result of an electronic device, according to an embodiment of the disclosure.

FIG. 7C illustrates a radiation simulation result of an electronic device, according to an embodiment of the disclosure.

Referring to FIG. 7C, a first graph 731 and a second graph 732 are illustrated. In an embodiment, the first graph 731 may indicate a radiation characteristic in the case where a power is supplied to an electrical path where a 5G antenna module (e.g., the antenna module 160 of FIG. 2) is not included in a radiator operating as a legacy antenna, such that the electrical path operates as the legacy antenna. For example, the first graph 731 may indicate a radiation characteristic in the case where an electrical path including at least a portion of the side member 710*a* or 710*b* is supplied with a power so as to operate as the legacy antenna. In an embodiment, the second graph 732 may indicate a radiation characteristic in the case where an electrical path including a 5G antenna module and at least a portion of the side member 710*a* or 710*b* is supplied with a power so as to operate as the legacy antenna. For example, the second graph 732 may indicate a radiation characteristic in the case where the first region 701*a* illustrated in FIG. 7A operates as the legacy antenna.

Referring to the second graph 732, it may be observed that a conductive region (e.g., the conductive region 163 of FIG. 2) of the 5G antenna module, which operates as a ground, is able to be used as a radiator of the legacy antenna. For example, in the second graph 732, it may be observed that resonance occurs at about 1.2 GHz and at about 2.4 GHz. Accordingly, it may be observed that the electronic device 700*a* or 700*b* illustrated in FIG. 7A or 7B communicates with a base station or an external electronic device in a frequency band ranging from 400 MHz to 6 GHz, as well as an Above 6 GHz frequency band.

Also, referring to the second graph 732, it may be observed that resonance additionally occurs compared with the radiation characteristic illustrated in the first graph 731. For example, it may be observed from the first graph 731 that resonance occurs only at about 1.25 GHz, and it may be observed from the second graph 732 that resonance occurs at two regions (i.e., at about 1.25 GHz and at about 2.4 GHz). In the case of the second graph 732, it may be understood that a resonant point of the legacy antenna is added as the conductive region of the 5G antenna module operates as an additional radiator. Accordingly, the electronic device 700*a* or 700*b* illustrated in FIG. 7A or 7B may communicate with a base station or an external electronic device by using signals in various frequency bands.

Figure 8A:
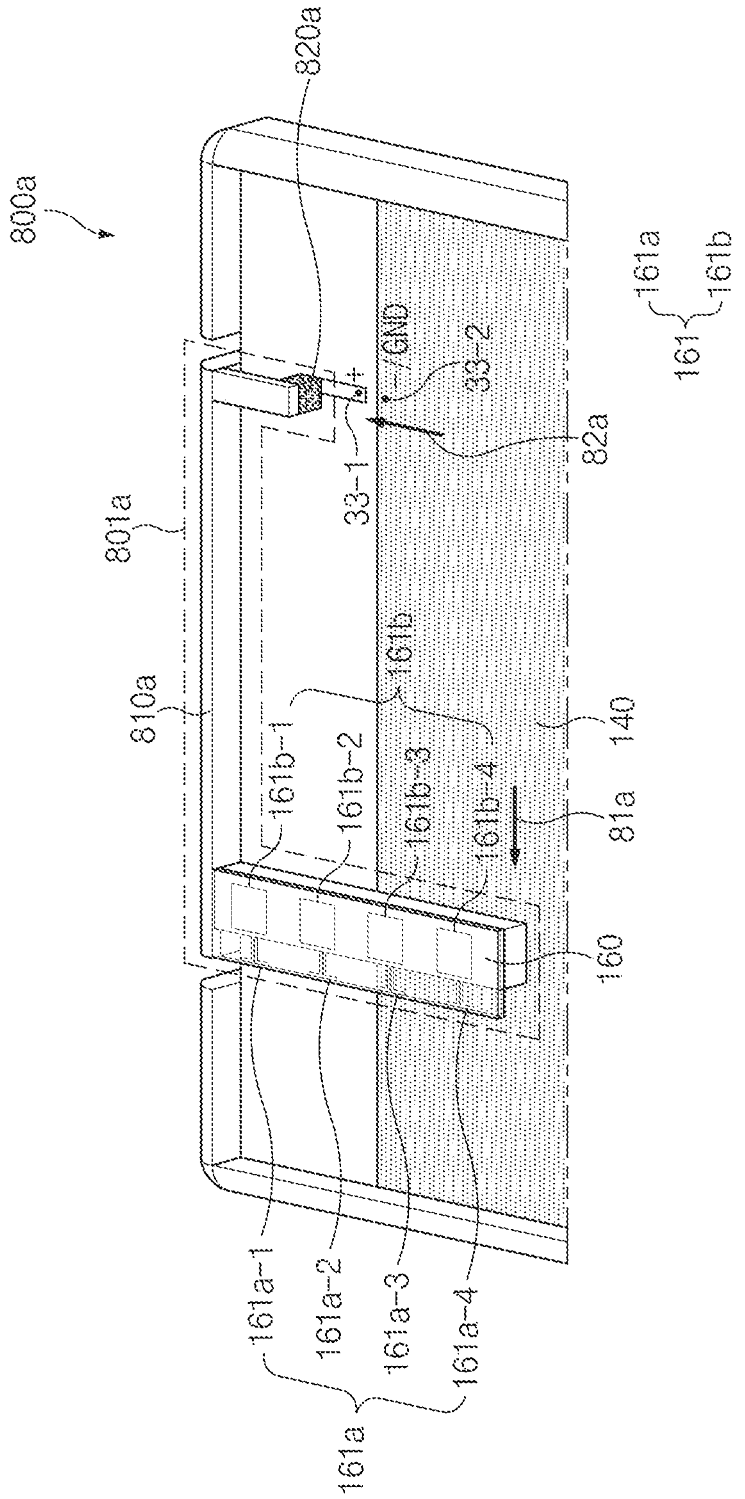
FIGS. 8A and 8B are inner perspective views of an electronic device including a loop-type antenna using a metal frame, according to various embodiments of the disclosure.
Figure 8B:
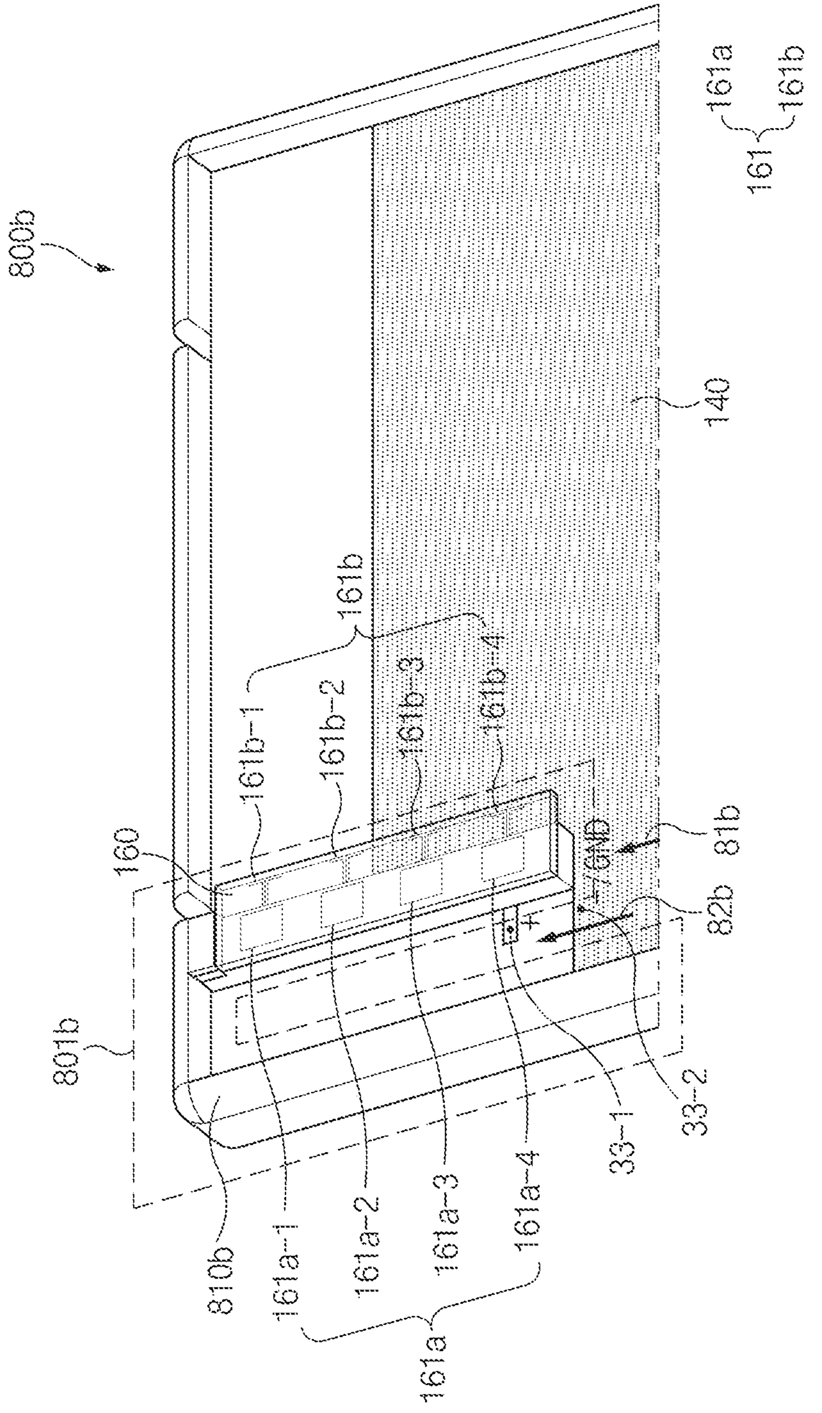

FIGS. 8A and 8B are inner perspective views of an electronic device including a loop-type antenna using a metal frame, according to various embodiments of the disclosure.

Referring to FIGS. 8A and 8B, an electronic device 800*a* or 800*b* may include the 5G antenna module 160, the printed circuit board 140, and a side member 810*a* or 810*b* of a housing. In an embodiment, the 5G antenna module 160 and the printed circuit board 140 may at least partially over each other. The electronic device 800*a* or 800*b* may perform communication using the millimeter wave signal through the antenna array 161 included in the 5G antenna module 160. Also, the electronic device 800*a* or 800*b* may perform communication using a signal in a specified frequency band, for example, ranging from 400 MHz to 6 GHz through an electrical path at least including a conductive region (e.g., the conductive region 163 of FIG. 2) included in the 5G antenna module 160.

In an embodiment, the feeding of a power to the antenna array 161 may be made in a direction of a first arrow 81*a* or 81*b*, and the feeding of a power to the conductive region may be made in a direction of a second arrow 82*a* or 82*b*. Examples are illustrated in FIGS. 8A and 8B as the feed point 33-1 and the printed circuit board 140 are electrically or physically separated, but it may be understood that the feed point 33-1 and the printed circuit board 140 are electrically or physically connected through at least one conducting wire, for example, the second conducting wire 35*b* as illustrated in FIG. 3B. In FIGS. 8A and 8B, with regard to the description given with reference to FIGS. 1 and 4A to 4C, additional description will be omitted to avoid redundancy.

According to an embodiment, the side member 810*a* or 810*b* of the housing may be formed of a conductive material. In an embodiment, the side member 810*a* or 810*b* may be electrically connected with the conductive region of the 5G antenna module 160. For example, the conductive region of the 5G antenna module 160, for example, a shield can (e.g., the shield can 420 of FIG. 4A) may physically contact the side member 810*a* or 810*b* or may be electrically connected with the side member 810*a* or 810*b* by a connection member.

According to an embodiment, the side member 810*a* or 810*b* and the conductive region of the 5G antenna module 160 may form at least one electrical path. The electronic device 800*a* or 800*b* may feed a power to the electrical path through a second communication circuit (e.g., the second communication circuit 141 of FIG. 2) and may transmit or receive a signal in a specified frequency band, for example, a Sub-6 GHz band.

According to an embodiment, the electrical path may be in the shape of a loop that starts a feed point, passes through the side member 810*a*, and includes the conductive region of the 5G antenna module 160, as illustrated in FIG. 8A. In an embodiment, the feeding of a power to the electrical path may be made from the side member 810*a* or 810*b* through a connection member 820*a*, for example, a C-clip formed of a conductive material. The conductive region of the 5G antenna module 160 may be electrically connected with a ground region (e.g., the ground region 142 of FIG. 2) of the printed circuit board 140.

According to another embodiment, the electrical path may be in the shape of a loop that starts from a feed point, passes through the conductive region of the 5G antenna module 160, and includes the side member 810*b*. In an embodiment, the feeding of a power to the electrical path may be made from the conductive region of the 5G antenna module 160. At least a portion of the side member 810*b* may be electrically connected with the ground region of the printed circuit board 140.

In an embodiment, in the electronic device 800*a* (or the electronic device 800*b*), a first region 801*a* (or a second region 801*b*) including the electrical path may form electromagnetic resonance through power feeding, and the first region 801*a* (or the second region 801*b*) may operate as a legacy antenna for transmitting or receiving a signal in a specified frequency band.

Figure 8C:
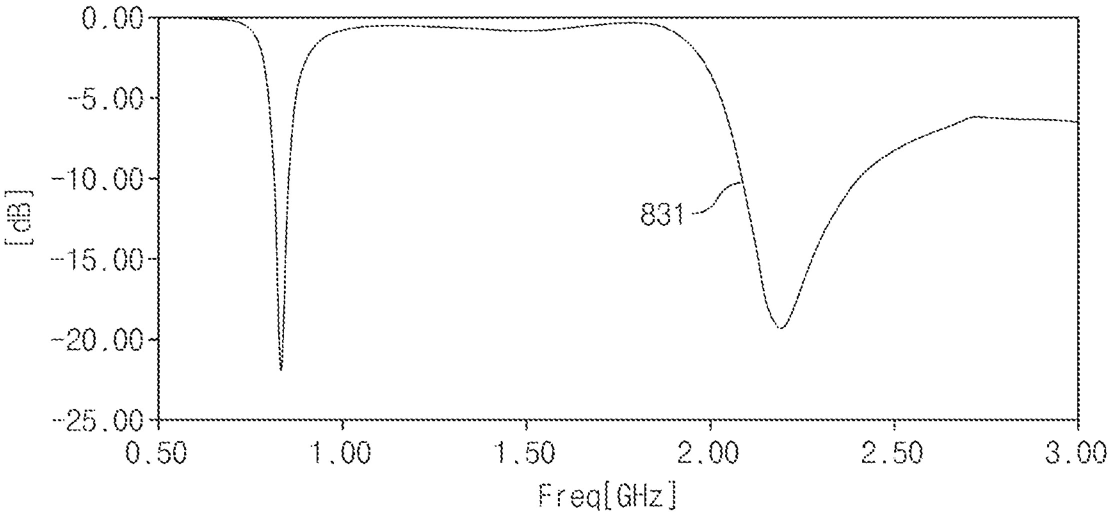
FIG. 8C illustrates a radiation simulation result of an electronic device according to an embodiment of the disclosure.

FIG. 8C illustrates a radiation simulation result of an electronic device according to an embodiment of the disclosure.

Referring to FIG. 8C, a first graph 831 is illustrated. In an embodiment, the first graph 831 may indicate a radiation characteristic in the case where an electrical path including a 5G antenna module (e.g., the 5G antenna module 160 of FIG. 2) and at least a portion of the side member 810*a* or 810*b* is supplied with a power so as to operate as a legacy antenna of a loop type. For example, the first graph 831 may indicate a radiation characteristic in the case where the first region 801*a* illustrated in FIG. 8A operates as the legacy antenna.

Referring to the first graph 831, it may be observed that a conductive region (e.g., the conductive region 163 of FIG. 1) of the 5G antenna module operating as a ground is able to be used as a radiator of the legacy antenna. For example, in the first graph 831, it may be observed that resonance occurs at about 0.7 GHz and at about 2.2 GHz. Accordingly, it may be observed that the electronic device 800*a* or 800*b* illustrated in FIG. 8A or 8B communicates with a base station or an external electronic device in a frequency band ranging from 400 MHz to 6 GHz, as well as an Above 6 GHz frequency band.

Figure 9A:
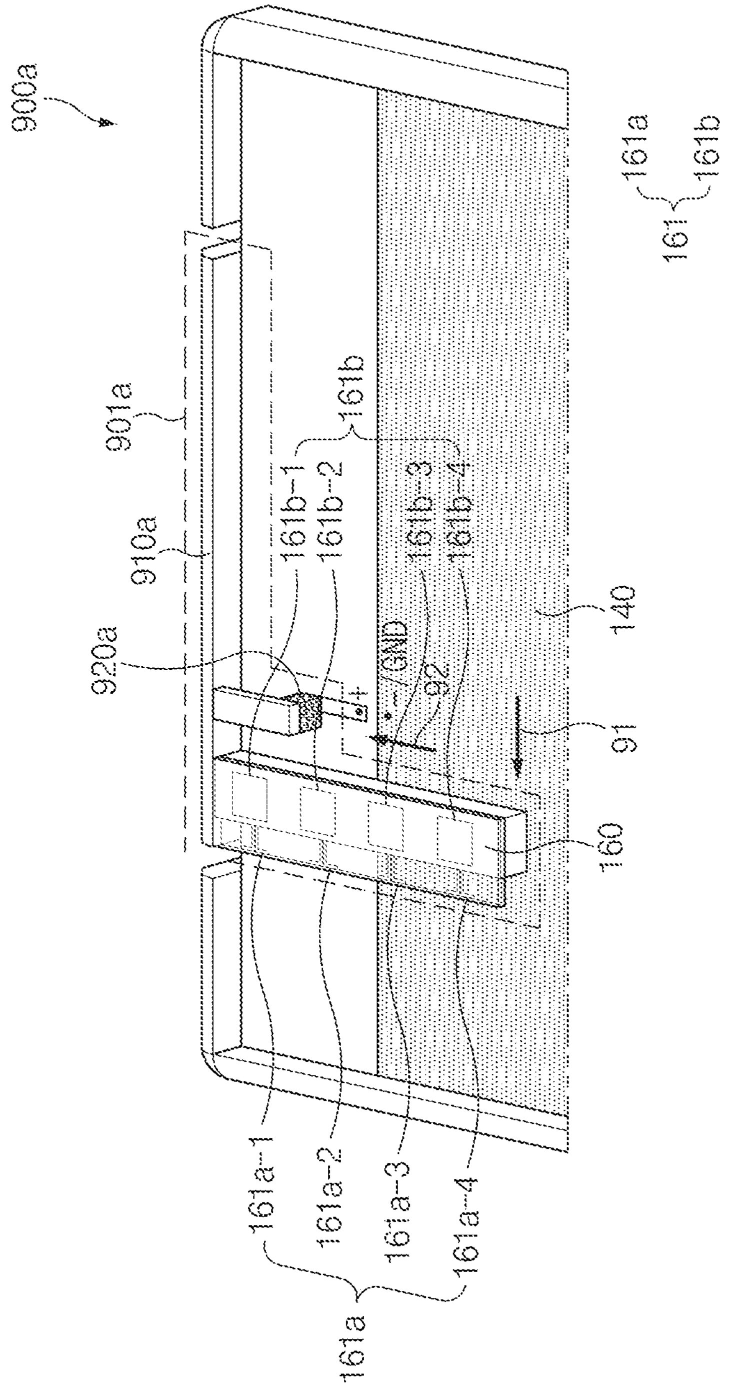
FIG. 9A is an inner perspective view of an electronic device including an antenna of a planar inverted-F antenna (PIFA) type using a metal frame, according to an embodiment of the disclosure.

FIG. 9A is an inner perspective view of an electronic device including an antenna of a planar inverted-F antenna (PIFA) type using a metal frame, according to an embodiment of the disclosure.

Referring to FIG. 9A, an electronic device 900*a* may include the 5G antenna module 160, the printed circuit board 140, and a side member 910*a* of a housing. The electronic device 900*a* may perform communication using the millimeter wave signal through the antenna array 161 included in the 5G antenna module 160. Also, the electronic device 900*a* may perform communication using a signal in a specified frequency band, for example, ranging from 400 MHz to 6 GHz through an electrical path at least including a conductive region (e.g., the conductive region 163 of FIG. 2) included in the 5G antenna module 160.

In an embodiment, the feeding of a power to the antenna array 161 may be made in a direction of a first arrow 91, and the feeding of a power to the conductive region may be made in a direction of a second arrow 92. An example is illustrated in FIG. 9A as the feed point 33-1 and the printed circuit board 140 are electrically or physically separated, but it may be understood that the feed point 33-1 and the printed circuit board 140 are electrically or physically connected through at least one conducting wire, for example, the second conducting wire 35*b* as illustrated in FIG. 3B. In FIG. 9A, with regard to the description given with reference to FIGS. 1 and 4A to 4C, additional description will be omitted to avoid redundancy.

According to an embodiment, the side member 910*a* of the housing may be formed of a conductive material. In an embodiment, the side member 910*a* may be electrically connected with the conductive region of the 5G antenna module 160. For example, the conductive region of the 5G antenna module 160, for example, a shield can (e.g., the shield can 420 of FIG. 4A) may physically contact the side member 910*a* or may be electrically connected with the side member 910*a* by a connection member.

According to an embodiment, the side member 910*a* and the conductive region of the 5G antenna module 160 may form at least one electrical path, for example, a first region 901*a* of the side member 910*a*. The electronic device 900*a* may feed a power to the electrical path using a second communication circuit (e.g., the second communication circuit 141 of FIG. 2) and may transmit or receive a signal in a specified frequency band, for example, a Sub-6 GHz band.

According to an embodiment, the electrical path, for example, the first region 901*a* may be branched into two opposite portions from the feed point 33-1; any one of the two opposite portions, that is, one portion including the conductive region of the 5G antenna module 160 may be connected with a ground region (e.g., the ground region 142 of FIG. 2) of the printed circuit board 140. In an embodiment, the feeding of a power to the electrical path may be made from the side member 910*a* or 5G through a connection member 920*a*, for example, a C-clip formed of a conductive material, and the conductive region of the 5G antenna module 160 may be electrically connected with the ground region.

In an embodiment, in the electronic device 900*a*, the first region 901*a* including the electrical path may form electromagnetic resonance through power feeding, and the first region 901*a* may operate as a legacy antenna for transmitting or receiving a signal in the specified frequency band, for example, as an antenna of a PIFA type.

Figure 9B:
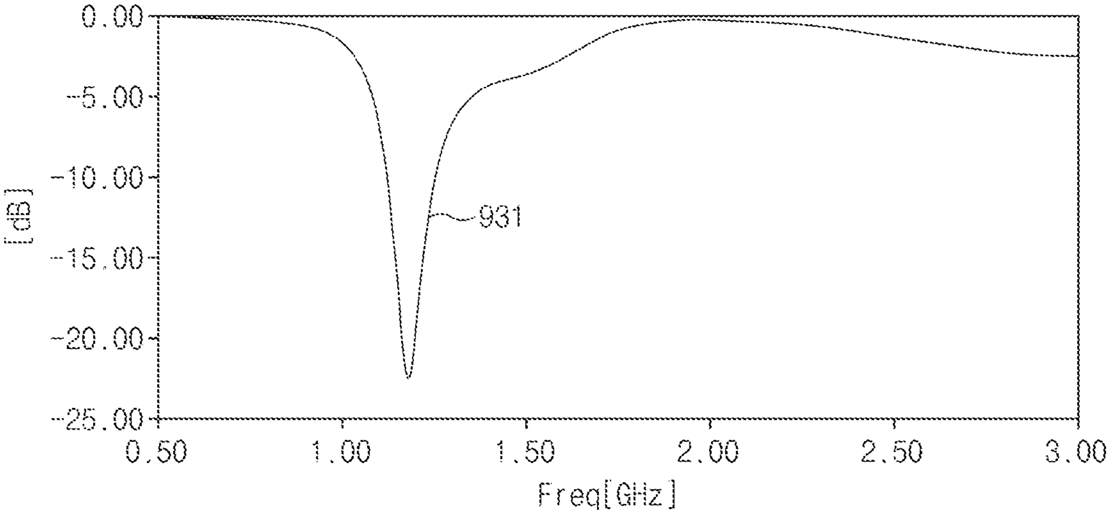
FIG. 9B illustrates a radiation simulation result of an electronic device, according to an embodiment of the disclosure.

FIG. 9B illustrates a radiation simulation result of an electronic device, according to an embodiment of the disclosure.

Referring to FIG. 9B, a first graph 931 is illustrated. In an embodiment, the first graph 931 may indicate a radiation characteristic in the case where an electrical path including a 5G antenna module (e.g., the 5G antenna module 160 of FIG. 2) and at least a portion of the side member 910*a* is supplied with a power so as to operate as a legacy antenna of a PIFA type. For example, the first graph 931 may indicate a radiation characteristic in the case where the first region 901*a* illustrated in FIG. 9A operates as the legacy antenna.

Referring to the first graph 931, it may be observed that a conductive region (e.g., the conductive region 163 of FIG. 1) of the 5G antenna module operating as a ground is able to be used as a radiator of the legacy antenna. For example, in the first graph 931, it may be observed that resonance occurs at about 1.2 GHz. Accordingly, it may be observed that the electronic device 900*a* illustrated in FIG. 9A communicates with a base station or an external electronic device in a frequency band ranging from 400 MHz to 6 GHz, as well as an Above 6 GHz frequency band.

Figure 10:
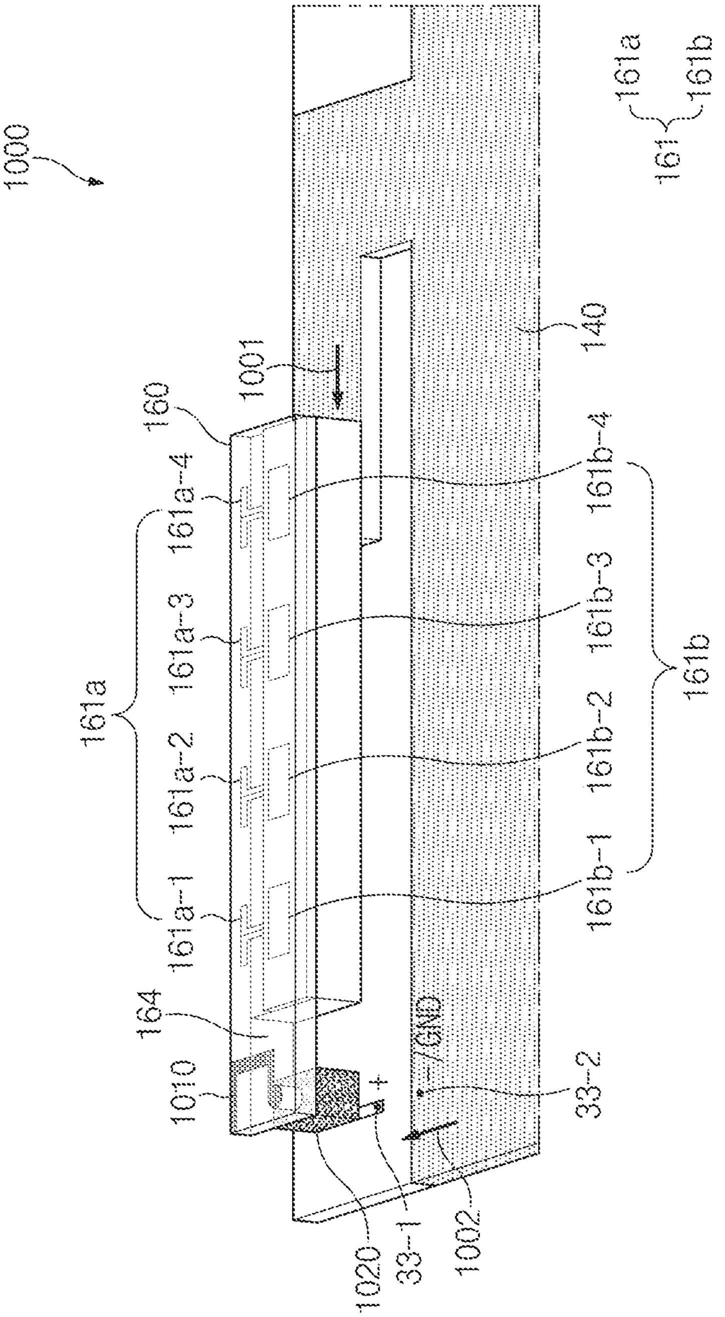
FIG. 10 is a view illustrating an electronic device including an antenna using a non-conductive region of a 5G antenna module, according to an embodiment of the disclosure.

FIG. 10 is a view illustrating an electronic device including an antenna using a non-conductive region of a 5G antenna module, according to an embodiment.

Referring to FIG. 10, an electronic device 1000 may include the 5G antenna module 160 and the printed circuit board 140. The electronic device 1000 may perform communication using the millimeter wave signal through the antenna array 161 included in the 5G antenna module 160. Also, the electronic device 1000 may perform communication using a signal in a specified frequency band, for example, ranging from 400 MHz to 6 GHz through an electrical path including at least a partial region of the 5G antenna module 160.

In an embodiment, the feeding of a power to the antenna array 161 may be made in a direction of a first arrow 1001, and the feeding of a power to the conductive region 163 may be made in a direction of a second arrow 1002. An example is illustrated in FIG. 10 as the feed point 33-1 and the printed circuit board 140 are electrically or physically separated, but it may be understood that the feed point 33-1 and the printed circuit board 140 are electrically or physically connected through at least one conducting wire, for example, the second conducting wire 35*b* as illustrated in FIG. 3B. In FIG. 10, with regard to the description given with reference to FIGS. 1 and 4A to 4C, additional description will be omitted to avoid redundancy.

According to an embodiment, the 5G antenna module 160 may include at least one non-conductive region 164. In an embodiment, the non-conductive region 164 may be used as a means for fixing or supporting the 5G antenna module 160. For example, the non-conductive region 164 may be in contact with one surface of the side bezel structure 110, the first support member 111, or the second support member 170 illustrated in FIG. 1. As such, the 5G antenna module 160 may be fixed or supported in the electronic device 1000.

According to an embodiment, a conductive pattern 1010 may be formed in the non-conductive region 164. For example, the conductive pattern 1010 may be formed of a conductive material having a specified length and may be formed in a portion of the non-conductive region 164. According to an embodiment, the conductive pattern 1010 may be electrically connected with a feed line through a connection member 1020. The connection member 1020 may be a C-clip formed of a conductive material.

According to an embodiment, the conductive pattern 1010 and the connection member 1020 may form at least one electrical path. The electronic device 1000 may feed a power to the electrical path using a second communication circuit (e.g., the second communication circuit 141 of FIG. 2) and may transmit or receive a signal in a specified frequency band, for example, a Sub-6 GHz band.

Figure 11:
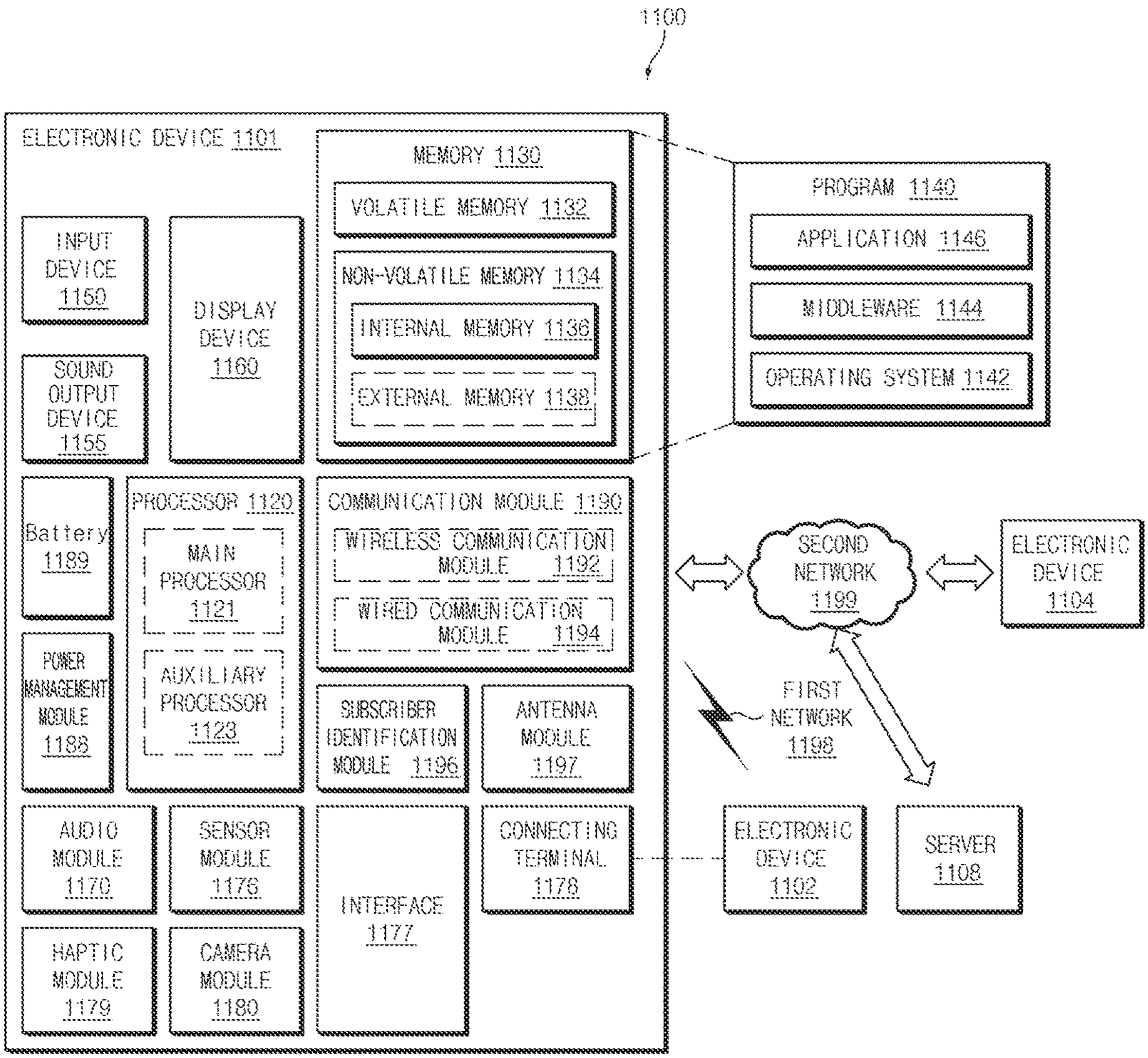

FIG. 11 is a block diagram illustrating an electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thererto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™ wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

Figure 12:
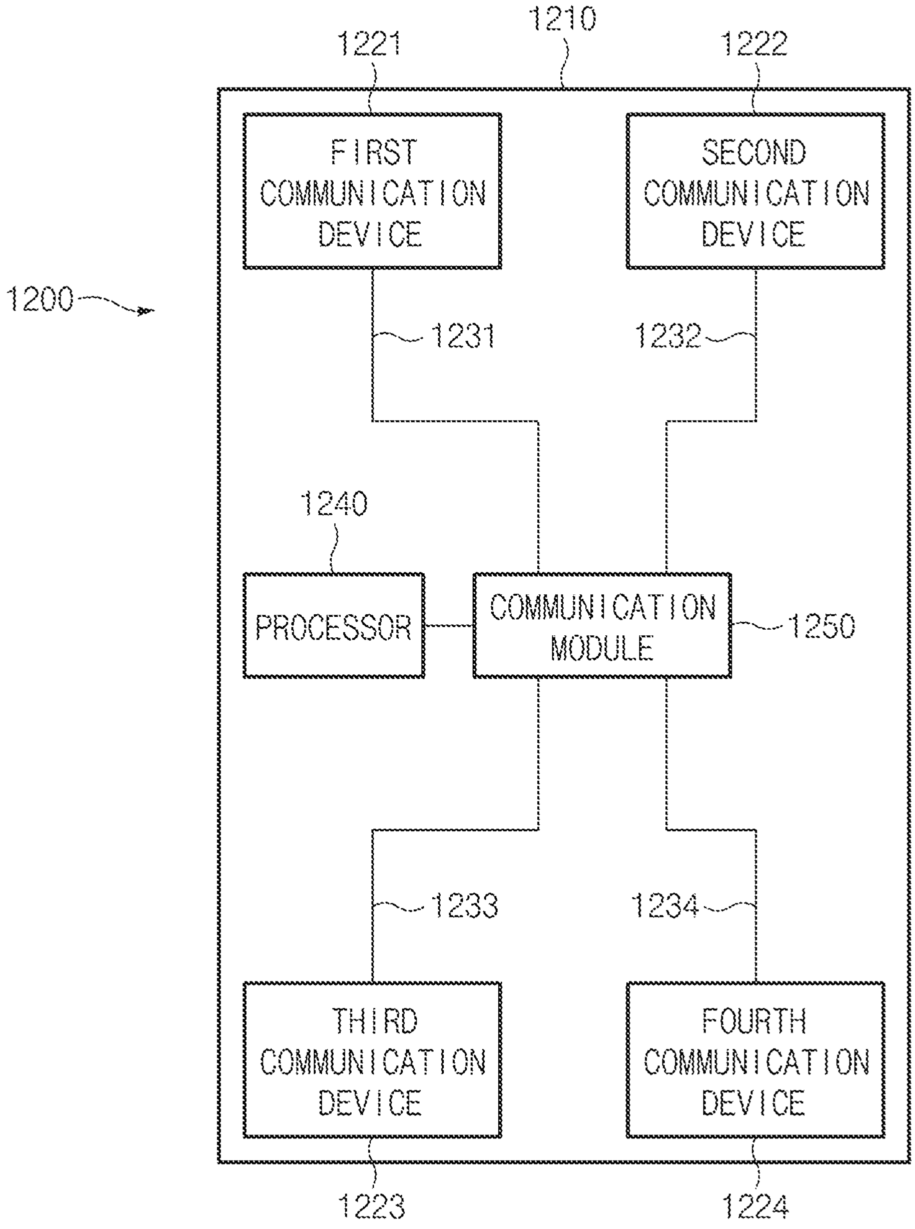
FIG. 12 is a view illustrating an example of an electronic device supporting 5G communication according to an embodiment of the disclosure.

FIG. 12 is a view illustrating an example of an electronic device supporting 5G communication according to an embodiment of the disclosure.

Referring to FIG. 12, an electronic device 1200 (e.g., the electronic device 1101 of FIG. 11) may include a housing 1210, a processor 1240 (e.g., the processor 1120 of FIG. 11), a communication module 1250 (e.g., the communication module 1190 of FIG. 11), a first communication device 1221, a second communication device 1222, a third communication device 1223, a fourth communication device 1224, a first conductive line 1231, a second conductive line 1232, a third conductive line 1233, or a fourth conductive line 1234.

According to an embodiment, the housing 1210 may protect any other components of the electronic device 1200. The housing 1210 may include, for example, a front plate, a back plate facing away from the front plate, and a side member (or a metal frame) surrounding a space between the front plate and the back plate. The side member may be attached to the back plate or may be integrally formed with the back plate.

According to an embodiment, the electronic device 1200 may include at least one communication device. For example, the electronic device 1200 may include at least one of the first communication device 1221, the second communication device 1222, the third communication device 1223, or the fourth communication device 1224.

According to an embodiment, the first communication device 1221, the second communication device 1222, the third communication device 1223, or the fourth communication device 1224 may be positioned in the housing 1210. According to an embodiment, when viewed from above the back plate of the electronic device 1200, the first communication device 1221 may be disposed on the left top of the electronic device 1200, the second communication device 1222 may be disposed on the right top of the electronic device 1200, the third communication device 1223 may be disposed on the left bottom of the electronic device 1200, and the fourth communication device 1224 may be disposed on the right bottom of the electronic device 2100.

According to an embodiment, the processor 1240 may include one or more of a central processing unit, an application processor, a graphic processing unit (GPU), an image signal processor of a camera, or a baseband processor (or a communication processor (CP)). According to an embodiment, the processor 1240 may be implemented with a system on chip (SoC) or a system in package (SiP).

According to an embodiment, the communication module 1250 may be electrically connected with at least one communication device by using at least one conductive line. For example, the communication module 1250 may be electrically connected with the first communication device 1221, the second communication device 1222, the third communication device 1223, or the fourth communication device 1224 by using the first conductive line 1231, the second conductive line 1232, the third conductive line 1233, or the fourth conductive line 1234. The communication module 1250 may include, for example, a baseband processor or at least one communication circuit (e.g., an IF IC or an RFIC). The communication module 1250 may include, for example, a baseband processor that is independent of the processor 1240 (e.g., an application processor (AP)). The first conductive line 1231, the second conductive line 1232, the third conductive line 1233, or the fourth conductive line 1234 may include, for example, a coaxial cable or a FPCB.

According to an embodiment, the communication module 1250 may include a first baseband processor (BP) (not illustrated) or a second baseband processor (not illustrated). The electronic device 1200 may further include one or more interfaces for supporting inter-chip communication between the first BP (or the second BP) and the processor 1240. The processor 1240 and the first BP or the second BP may transmit/receive data by using the inter-chip interface (e.g., an inter processor communication channel).

According to an embodiment, the first BP or the second BP may provide an interface for performing communication with any other entities. The first BP may support, for example, wireless communication with regard to a first network (not illustrated). The second BP may support, for example, wireless communication with regard to a second network (not illustrated).

According to an embodiment, the first BP or the second BP may form one module with the processor 1240. For example, the first BP or the second BP may be integrally formed with the processor 1240. For another example, the first BP or the second BP may be disposed in one chip or may be implemented in the form of an independent chip. According to an embodiment, the processor 1240 and at least one baseband processor (e.g., the first BP) may be integrally formed in one chip (e.g., a SoC), and another baseband processor (e.g., the second BP) may be implemented in the form of an independent chip.

According to an embodiment, the first network (not illustrated) or the second network (not illustrated) may correspond to the network 1199 of FIG. 11. According to an embodiment, the first network (not illustrated) and the second network (not illustrated) may include a $4^{th}$ generation (4G) network and a $5^{th}$ generation (5G) network, respectively. The 4G network may support, for example, a long term evolution (LTE) protocol defined in the 3GPP. The 5G network may support, for example, a new radio (NR) protocol defined in the 3GPP.

Figure 13:
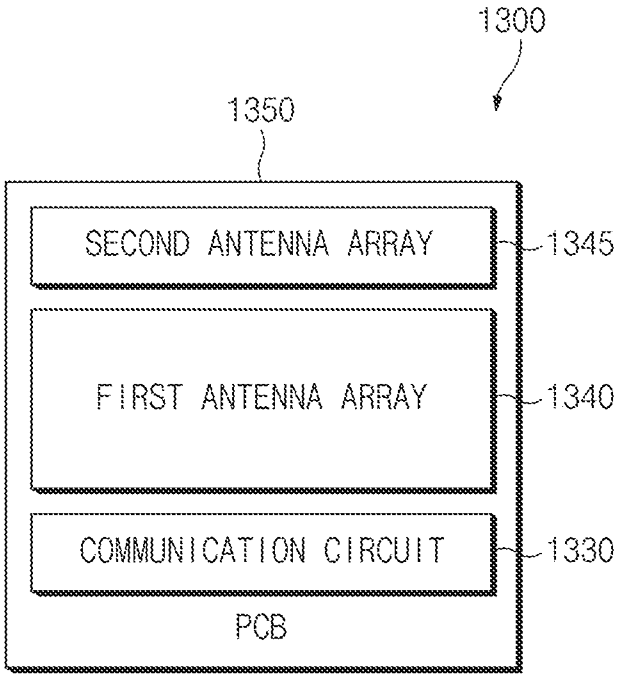
FIG. 13 is a block diagram of a communication device according to an embodiment of the disclosure.

FIG. 13 is a block diagram of a communication device according to an embodiment of the disclosure.

Referring to FIG. 13, a communication device 1300 (e.g., the first communication device 1221, the second communication device 1222, the third communication device 1223, or the fourth communication device 1224 of FIG. 12) may include a communication circuit 1330 (e.g., an RFIC), a PCB 1350, a first antenna array 1340, or a second antenna array 1345.

According to an embodiment, the communication circuit 1330, the first antenna array 1340, or the second antenna array 1345 may be disposed on the PCB 1350. For example, the first antenna array 1340 or the second antenna array 1345 may be disposed on a first surface of the PCB 1350, and the communication circuit 1330 may be disposed on a second surface of the PCB 1350. The PCB 1350 may include a connector (e.g., a coaxial cable connector or a board to board (B-to-B) connector) for electrical connection with any other PCB (e.g., a PCB on which the communication module 1250 of FIG. 12 is disposed) by using a transmission line (e.g., the first conductive line 1231 of FIG. 12 or a coaxial cable). For example, the PCB 1350 may be connected to the PCB, on which the communication module 1250 is disposed, by using the coaxial cable connector, and the coaxial cable may be used to transfer a receive/transmit IF signal or an RF signal. For another example, a power or any other control signal may be transferred through the B-to-B connector.

According to an embodiment, the first antenna array 1340 or the second antenna array 1345 may include a plurality of antenna elements. The antenna elements may include a patch antenna, a loop antenna, or a dipole antenna. For example, an antenna element included in the first antenna array 1340 may be a patch antenna for forming a beam toward the back plate of the electronic device 1200. For another example, an antenna element included in the second antenna array 1345 may be a dipole antenna or a loop antenna for the purpose of forming a beam toward the side member of the electronic device 1200.

According to an embodiment, the communication circuit 1330 may support at least a portion (e.g., 24 GHz to 30 GHz or 37 GHz to 40 GHz) of a band ranging from 24 GHz to 100 GHz. According to an embodiment, the communication circuit 1330 may up-convert or down-convert a frequency. For example, the communication circuit 1330 included in the communication device 1300 (e.g., the first communication device 1221 of FIG. 12) may up-convert an IF signal received from a communication module (e.g., the communication module 1250 of FIG. 12) through a conductive line (e.g., the first conductive line 1231 of FIG. 2A) to an RF signal. For another example, the communication circuit 1330 included in the communication device 1300 (e.g., the first communication device 1221 of FIG. 12) may down-convert an RF signal (e.g., a millimeter wave signal) received through the first antenna array 1340 or the second antenna array 1345 to an IF signal and may provide the IF signal to a communication module by using a conductive line.

An electronic device (e.g., the electronic device 100 of FIG. 2) according to an embodiment of the disclosure may include a 5G antenna module (e.g., the 5G antenna module 160 of FIG. 2) that includes an antenna array (e.g., the antenna array 161 of FIG. 2), at least one conductive region (e.g., the conductive region 163 of FIG. 2) operating as a ground with respect to the antenna array, and a first communication circuit (e.g., the first communication circuit 162 of FIG. 2) feeding a power to the antenna array to communicate through a millimeter wave signal, and a printed circuit board (PCB) (e.g., the printed circuit board 140 of FIG. 2) that includes a second communication circuit (e.g., the second communication circuit 141 of FIG. 2) and a ground region (e.g., the ground region 142 of FIG. 2). The second communication circuit may feed the power to an electrical path at least including the at least one conductive region and may transmit or receive a signal in a frequency band different from a frequency band of the millimeter wave signal based on the electrical path supplied with the power and the ground region.

According to an embodiment, the electronic device may further include a conductive element (e.g., the conductive element 510 of FIG. 5) that is extended from the at least one conductive region and forms at least a portion of the electrical path.

In an embodiment, the electronic device may further include a connection member (e.g., the connection member 520 of FIG. 5) that electrically connects the at least one conductive region and the conductive element.

According to an embodiment, at least a portion of the 5G antenna module may be mounted on at least one sub printed circuit board (e.g., the layer structure 410*b* of FIG. 4B).

In an embodiment, the electronic device may further include a flexible printed circuit board (e.g., the third layer structure 410*c*_3 of FIG. 4B). The sub printed circuit board may include a first sub printed circuit board (e.g., the first layer structure 410*c*_1 of FIG. 4B) where the antenna array and a portion of the at least one conductive region are mounted, and a second sub printed circuit board (e.g., the second layer structure 410*c*_2 of FIG. 4B) where a remaining portion of the at least one conductive region and the first communication circuit are mounted, and the flexible printed circuit board may include a first conducting wire electrically connecting the antenna array and the first communication circuit, and a second conducting wire electrically connecting the portion and the remaining portion of the at least one conductive region.

According to an embodiment, the electronic device may further include a housing that includes a first surface, a second surface opposite to the first surface, and a side member surrounding a space between the first surface and the second surface and formed of a conductive material, at least a portion of the side member may be electrically connected with the at least one conductive region, and the electrical path may include at least a portion of the side member.

In an embodiment, the electrical path may operate as a radiator of an antenna of a planar inverted-F antenna (PIFA) type. In an embodiment, the electrical path may operate as a radiator of a loop-type antenna.

According to an embodiment, the frequency band different from the frequency band of the millimeter wave signal may include 400 MHz to 6 GHz.

According to an embodiment, the 5G antenna module may correspond to a first 5G antenna module, the antenna array may correspond to a first antenna array, the electronic device may further include a second 5G antenna module that includes a second antenna array and is disposed adjacent to the first 5G antenna module, and the first communication circuit may feed the power to the first antenna array or the second antenna array to communicate through a millimeter wave signal.

In an embodiment, the first antenna array may be of a form of 1×n arrangement, and the second antenna array may be of a form of m×m arrangement.

According to an embodiment, at least a portion of the at least one conductive region may operate as a shield can.

According to an embodiment, the antenna array may include a plurality of dipole antenna elements or a plurality of patch antenna elements.

According to an embodiment, the printed circuit board may further include an intermediate frequency integrated circuit (IF IC) that is electrically connected with the first communication circuit, and the IF IC may transfer a feed signal to the first communication circuit such that the power is supplied to the antenna array.

According to an embodiment, at least a portion of the 5G antenna module and at least a portion of the printed circuit board may be electrically coupled through a flexible printed circuit board, a C-clip, a screw, a pogo pin, foam, or a plate-shaped spring.

An electronic device according to another embodiment of the disclosure may include a housing that includes a first plate, a second plate facing away from the first plate, and a side member surrounding a space between the first plate and the second plate, a first printed circuit board (PCB) that is disposed in the housing, an antenna structure that is disposed in the housing and includes a second printed circuit board including a first surface facing in a first direction, a second surface facing away from the first surface, and at least one conductive region between the first surface and the second surface, and an antenna array formed at at least a portion of the second printed circuit board, a first wireless communication circuit that is electrically connected to the antenna array and transmits and/or receives a first signal having a frequency between 6 GHz and 100 GHz, and a second wireless communication circuit that is electrically connected to the at least one conductive region and transmits and/or receives a second signal having a frequency between 400 MHz and 6 GHz.

According to an embodiment, the second printed circuit board may include at least one non-conductive region, and the at least one conductive region may be implemented with a conductive pattern formed on the non-conductive region.

According to an embodiment, the electronic device may further include a conductive element that is extended from the at least one conductive region.

According to an embodiment, at least a portion of the side member may be formed of a conductive material, and the at least a portion of the side member may be electrically connected with the at least one conductive region.

According to an embodiment, the antenna array may correspond to a first antenna structure, the antenna array may correspond to a first antenna array, the electronic device may further include a second antenna structure that includes a second antenna array and is disposed adjacent to the first antenna structure, and the first wireless communication circuit may be electrically connected to the first antenna array or the second antenna array and may transmit and/or receive a first signal having a frequency between 6 GHz and 100 GHz.

According to various embodiments of the disclosure, the performance of a 5G antenna module and the performance of a legacy antenna supporting a conventional communication technology may be maintained at a specified level or higher, with a mounting space limited. Also, an electronic device may be further miniaturized by using a mounting space efficiently. This may allow a user to make use of the electronic device that has a smaller size and more improved performance.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, the performance of a 5G antenna module and the performance of a legacy antenna supporting a conventional communication technology may be maintained at a specified level or higher, with a mounting space limited. According to various embodiments, an electronic device may be further miniaturized by using the mounting space of the 5G antenna module and the legacy antenna efficiently. Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing including:

a first plate, a second plate facing away from the first plate, and a side member surrounding a space between the first plate and the second plate;

a first printed circuit board (PCB) disposed in the housing;

an antenna structure disposed in the housing, and including:

a second printed circuit board, an antenna array formed on a first portion of the second printed circuit board, and at least one conductive region formed on a second portion of the second printed circuit board;

a first wireless communication circuit electrically connected to the antenna array and configured to transmit and/or receive a first signal having a frequency between 10 GHz and 100 GHz; and a second wireless communication circuit electrically connected to the at least one conductive region and configured to transmit and/or receive a second signal having a frequency different from the frequency of the first signal, wherein at least one conductive region is configured with a radiating element for the second signal, and wherein the second signal is transmitted or received at least partially with the at least one conductive region.

2. The electronic device of claim 1, wherein the second signal is transmitted or received at least partially with a ground of the antenna array for the first signal.

3. The electronic device of claim 1, wherein the second printed circuit board includes at least one non-conductive region, and wherein the at least one conductive region is implemented with a conductive pattern formed on a non-conductive region.

4. The electronic device of claim 1, wherein at least a portion of the side member is formed of a conductive material.

5. The electronic device of claim 1, wherein the at least a portion of the side member is electrically connected with the at least one conductive region.

6. The electronic device of claim 1, wherein the antenna array includes a plurality of patch antenna elements.

7. The electronic device of claim 1, wherein the antenna array includes a plurality of dipole antenna elements.

8. The electronic device of claim 1, wherein the second wireless communication circuit is configured to feed power to the at least one conductive region.

9. The electronic device of claim 1, further comprising:

a flexible printed circuit board electrically connecting the antenna array and the first wireless communication circuit.

10. A method of controlling an electronic device that includes a housing, a first plate, a second plate facing away from the first plate, a side member surrounding a space between the first plate and the second plate, a first printed circuit board (PCB) disposed in the housing, and an antenna structure including a second printed circuit board, an antenna array formed on a first portion of the second printed circuit board, and at least one conductive region formed on a second portion of the second printed circuit board, the method comprising:

transmitting or receiving a first signal having a frequency between 10 GHz and 100 GHz via a first wireless communication circuit electrically connected to the antenna array; and transmitting or receiving a second signal having a frequency different from a frequency of the first signal via a second wireless communication circuit electrically connected to the at least one conductive region.

11. The method of claim 10, wherein the at least one conductive region is configured with a radiating element for the second signal, and wherein the second signal is transmitted at least partially with the at least one conductive region.

12. The method of claim 10, wherein the second signal is transmitted at least partially with a ground of the antenna array for the first signal.

13. The method of claim 10, wherein the second printed circuit board includes at least one non-conductive region, and wherein the at least one conductive region is implemented with a conductive pattern formed on a non-conductive region.

14. The method of claim 10, wherein at least a portion of the side member is formed of a conductive material.

15. The method of claim 10, wherein the at least a portion of the side member is electrically connected with the at least one conductive region.

16. The method of claim 10, wherein the antenna array includes a plurality of patch antenna elements.

17. The method of claim 10, wherein the antenna array includes a plurality of dipole antenna elements.

18. The method of claim 10, wherein the second wireless communication circuit is configured to feed power to the at least one conductive region.

19. The method of claim 10, wherein the electronic device further comprises a flexible printed circuit board electrically connecting the antenna array and the first wireless communication circuit.

20. A non-transitory computer-readable storage medium configured to store one or more computer programs including instructions that, when executed by at least one processor of an electronic device that includes a housing, a first plate, a second plate facing away from the first plate, a side member surrounding a space between the first plate and the second plate, a first printed circuit board (PCB) disposed in the housing, and an antenna structure including a second printed circuit board, an antenna array formed on a first portion of the second printed circuit board, and at least one conductive region formed on a second portion of the second printed circuit board, cause the at least one processor to:

transmit and/or receive a first signal having a frequency between 10 GHz and 100 GHz via a first wireless communication circuit electrically connected to the antenna array; and transmit and/or receive a second signal having a frequency different from a frequency of the first signal via a second wireless communication circuit electrically connected to the at least one conductive region.

* * * * *